(12) United States Patent
Petit

(10) Patent No.: US 7,610,377 B2
(45) Date of Patent: Oct. 27, 2009

(54) OVERLOAD MANAGEMENT IN AN APPLICATION-BASED SERVER

(75) Inventor: Patrick Petit, Bresson (FR)

(73) Assignee: Sun Microsystems, Inc., Santa Clara, CA (US)

( * ) Notice: Subject to any disclaimer, the term of this patent is extended or adjusted under 35 U.S.C. 154(b) by 859 days.

(21) Appl. No.: 10/765,828

(22) Filed: Jan. 27, 2004

(65) Prior Publication Data

US 2005/0198285 A1  Sep. 8, 2005

(51) Int. Cl.
*G06F 15/173* (2006.01)
(52) U.S. Cl. .................. 709/225; 709/223; 709/224; 709/229; 709/235
(58) Field of Classification Search .................. 709/225
See application file for complete search history.

(56) References Cited

U.S. PATENT DOCUMENTS

| | | | |
|---|---|---|---|
| 5,249,290 A | 9/1993 | Heizer | |
| 5,878,224 A * | 3/1999 | Smith | 709/224 |
| 6,249,801 B1 | 6/2001 | Zisapel et al. | |
| 6,314,463 B1 * | 11/2001 | Abbott et al. | 709/224 |
| 6,317,786 B1 * | 11/2001 | Yamane et al. | 709/224 |
| 6,832,239 B1 | 12/2004 | Kraft et al. | |
| 6,836,785 B1 * | 12/2004 | Bakshi et al. | 709/203 |
| 6,912,534 B2 * | 6/2005 | DeBettencourt et al. | 707/10 |
| 6,961,341 B1 * | 11/2005 | Krishnan | 370/412 |
| 2003/0221007 A1 | 11/2003 | Chiu et al. | |

FOREIGN PATENT DOCUMENTS

JP  2003/067174  3/2003

OTHER PUBLICATIONS

"Getting Started with the Java Dynamic Management Kit 4.2." Sun Microsystems. Dec. 2000. pp. 1-50. Retrieved from http://docs-pdf.sun.com/806-6630/806-6630.pdf on Sep. 13, 2007.*
"Random Early Detection Gateways For Congestion Avoidance"; Floyd, S. & Jacobson, V; IEEE/ACM Transactions on Networking; Aug. 1993; pp. 397-413.
Combined Search and Examination Report; Application No. GB0501756.1; Date of Search: Mar. 23, 2005.

* cited by examiner

*Primary Examiner*—Larry D Donaghue
*Assistant Examiner*—Nicholas Taylor
(74) *Attorney, Agent, or Firm*—Rory D. Rankin; Meyertons Hood Kivlin Kowert & Goetzel, P.C.

(57) ABSTRACT

An overload manager device including a monitoring function for evaluating successive values of the server operation parameter as a function of time, a first logic function capable of evaluating a first condition, which involves whether the server operation parameter passes a first threshold value in a first direction, a second logic function capable of evaluating a second condition, which involves whether a server operation parameter passes a second threshold value in a second direction, with the second direction being opposite to the first direction, and extending from the first threshold value to the second threshold value, and a request supervisor operable for starting rejection of input requests, upon verification of a third condition, related to the verification of at least one of the first and second conditions, and terminating rejection of the input requests upon verification of a fourth condition related to the verification of the second condition.

36 Claims, 13 Drawing Sheets

OVERLOAD MANAGEMENT IN AN APPLICATION-BASED SERVER

BACKGROUND OF THE INVENTION

1. Field of the Invention

This invention relates to the management of overload situations in computer-based server systems.

2. Description of the Related Art

Certain types of servers, e.g. directory servers or message servers, perform basic operations which are known in advance, both in number and nature. The average time needed for each task the server may perform is known in advance, at least approximately. Thus, servers of that type have predictable performance rating. In such servers, a potential overload situation may be anticipated by observing the number and/or nature of the requests that the server receives. This may be called "intrinsic overload management", referring to the fact the overloads are managed from the traffic of requests itself.

Other servers do not have predictable performance rating in that it is generally not possible to foresee a potential overload from the flow of incoming requests. Examples of such servers are application servers and portal servers: in an application server, the time needed for the server to execute a given application may vary considerably; in a portal server, the time needed to render a given web page available is also much variable, depending upon the number and nature of the channels being contained in that page. Such servers in fact "aggregate" a variable number of individual tasks. Thus, an "intrinsic overload management" is generally not feasible and/or not satisfactory.

SUMMARY OF THE INVENTION

A method of managing overload in a server system is disclosed, having a service operating in response to input requests, and a server operation parameter related to the operation of the service, the method comprising the steps of:
a. monitoring successive values of the server operation parameter as a function of time,
b. from such values,
  b1. evaluating a first condition, which involves whether the server operation parameter passes a first threshold value in a first direction, and
  b2. evaluating a second condition, which involves whether the server operation parameter passes a second threshold value in a second direction, with the second direction being opposite to the first direction, and extending from the first threshold value to the second threshold value,
c. starting rejection of input requests, upon verification of a third condition, related to the verification of at least one of the first and second conditions, and
d. terminating rejection of input requests upon verification of a fourth condition, related to the verification of the second condition.

It is also proposed an overload manager device for use in a server system, having a service operating in response to input requests, and a server operation parameter related to the operation of the service, the device comprising:
  a monitoring function for evaluating successive values of the server operation parameter as a function of time,
  a first logic function capable of evaluating a first condition, which involves whether the server operation parameter passes a first threshold value in a first direction,
  a second logic function capable of evaluating a second condition, which involves whether the server operation parameter passes a second threshold value in a second direction, with the second direction being opposite to the first direction, and extending from the first threshold value to the second threshold value, and
  a request supervisor operable for:
    starting rejection of the input requests, upon verification of a third condition, related to the verification of at least one of the first and second conditions, and
    terminating rejection of the input requests upon verification of a fourth condition related to the verification of the second condition.

BRIEF DESCRIPTION OF THE DRAWINGS

Other alternative features and advantages of the invention will appear in the detailed description below and in the appended drawings, in which.

Additionally, the detailed description is supplemented with the following Exhibits:
  Exhibit A contains background definitions;
  Exhibit B contains Java structures;
  Exhibit C contains examples of code.

DETAILED DESCRIPTION

In the foregoing description, references to the Exhibits may be made directly by the Exhibit or Exhibit section identifier, where the context is clear. The Exhibits are placed apart for the purpose of clarifying the detailed description, and of enabling easier reference. They nevertheless form part of this description.

As they may be cited in this specification, Sun, Sun Microsystems and Sun One are trademarks of Sun Microsystems, Inc.

Now, making reference to software entities imposes certain conventions in notation. For example, an expression indicated in a distinct font and/or in italics may be used to identify a code element.

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

The reader is assumed to be familiar with object oriented programming in general, more specifically with Java, JavaBeans, and MBeans. If necessary, more detailed information may be found in Exhibit A.

Figure 1:
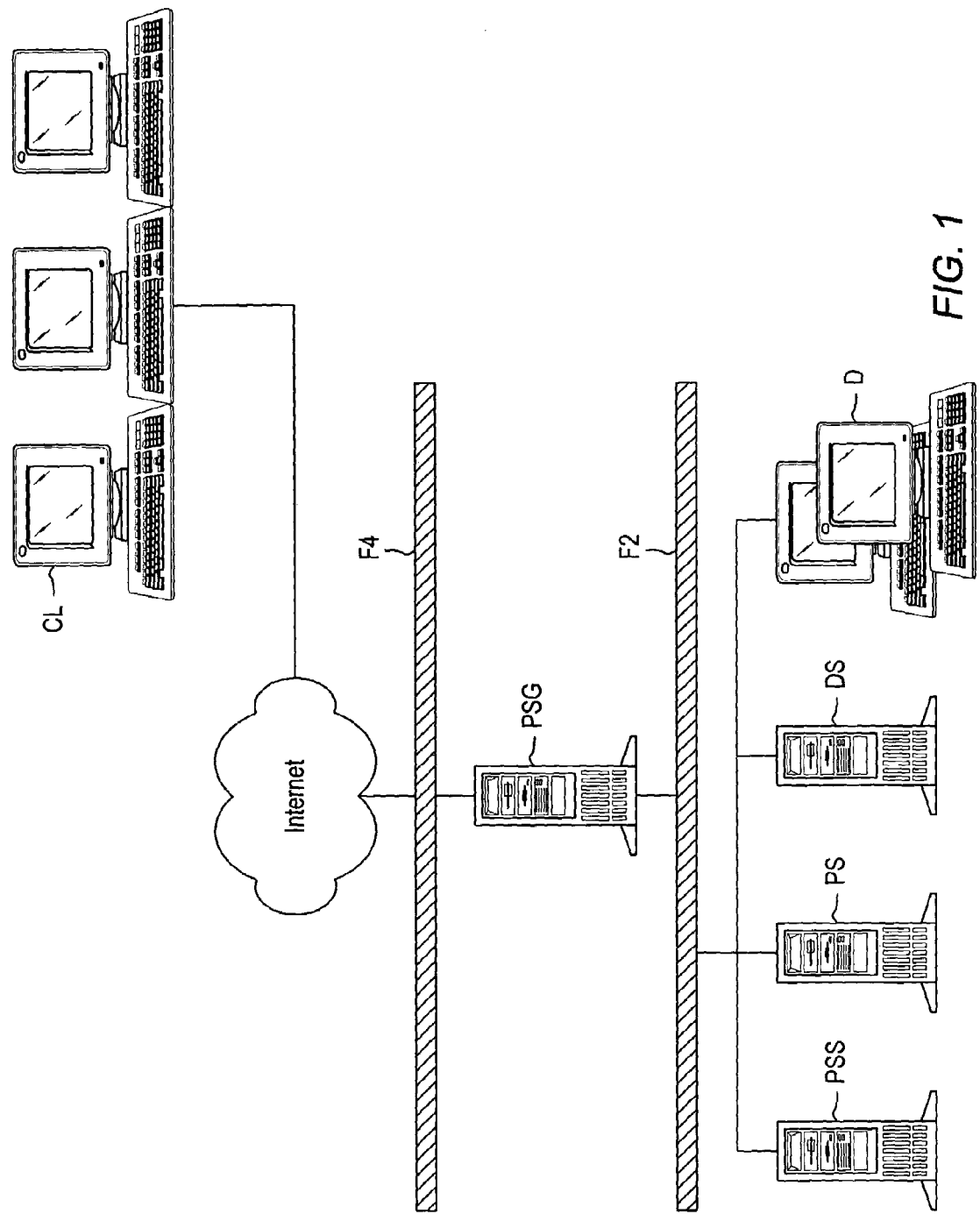
FIG. 1 shows an exemplary portal server architecture.

FIG. 1 is a diagram representing an exemplary portal server architecture. Portal server clients CL may connect to a specific web portal via Internet provided they meet predefined access conditions. Clients CL may comprise branch office or remote office employees, customers or suppliers.

Clients CL are behind the firewalls F1 and F2 that secure the portal server access. The portal server access is further secured by the portal server gateway PSG.

The web portal results from interactions between a plurality of servers like for instance the portal server PS that contains the identity server, the portal server search PSS, the directory server DS. These web portals also require Unix and PC desktops D.

Figure 2:
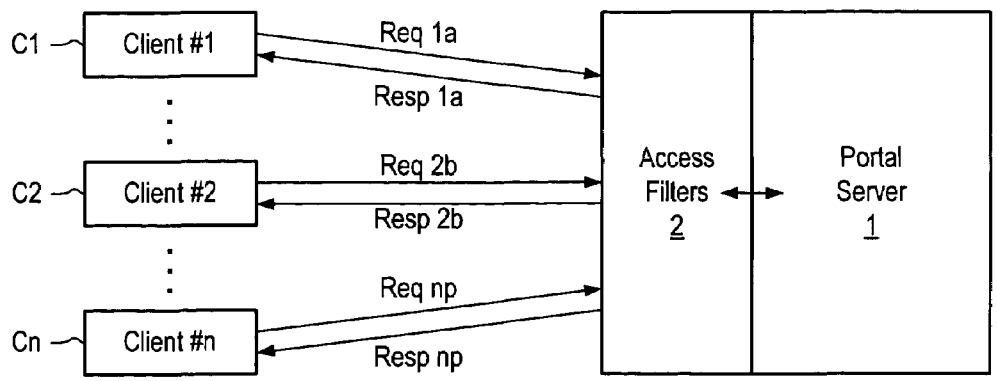
FIG. 2 shows a typical client-server interaction.

FIG. 2 shows a plurality of clients C1, C2 . . . Cn, sending requests to a Server 1, whose input has access filters 2. For example, client C1 may send a request Req_1a, and receive in response a return Resp_1a. Similarly, client C2 may send a request Req_2b and receive in response a return Resp_2b, or client Cn may send a request Req_np and receive in response return Resp_np. Access filters 2 may comprise a request supervisor or access control function, which may grant access, in which case e.g. Resp_np will be the actual server response to request Req_np, or deny access, in which case Resp_np will be a suitable indication that access has been denied.

Figure 3:
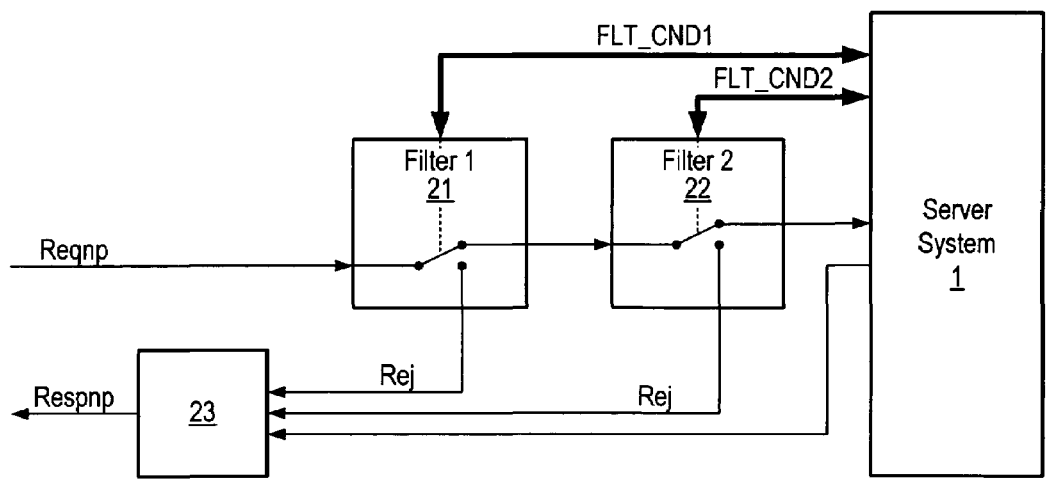
FIG. 3 illustrates the use of access filters at the input of a server.

As shown in FIG. 3, an overload management system for server 1 may comprise one or more filters 21 and 22, having filter conditions FLT_CND1 and FLT_CND2, dependent upon the current status of Server 1. In the example, the filters 21 and 22 act as switches in series, each of which conditions the fact that the request, e.g. Req_np, will actually reach server 1, and get an actual response Resp_np therefrom, or be filtered out, with Resp_np being an indication that access has been denied, e.g. the HTTP error code 503 (server busy).

Figure 4:
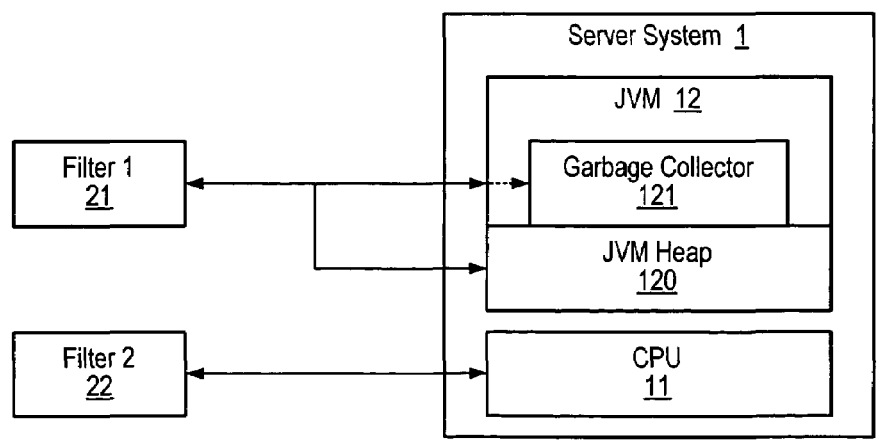
FIG. 4 shows an exemplary embodiment of this invention, in which filters take care of memory overload and of CPU overload.

FIG. 4 shows an exemplary embodiment of this invention, in which filter 21 takes care of memory overload, while filter 22 is in charge of CPU overload.

The condition FLT_CND1 of filter 21 may define a memory overload condition, based on various data related to memory occupation. In the example, a Java virtual machine or JVM is being used in server 1. Then, the memory occupation will be basically that of the JVM heap memory 120.

The goal of the Memory Overload Filter 21 is to ensure that memory usage does not grow unbounded in Server 1. It has been observed that memory space depletion happens in the JVM Heap, and is generally a measure of the number of concurrent sessions that exit in the system. Each session consumes a portion of memory through the creation of transient objects that are cached for a user, hence can easily exceed the memory capacity of the server if no control is applied.

In certain cases, a memory usage threshold could be calculated based on the JVM heap size and the average size of the session objects. Usage threshold could then be enforced by controlling the maximum number of concurrent sessions allowed on the system. However, this method may not be applicable, e.g. when the variance in session objects size is substantial. When this happens, it is preferred to control the total amount of allocated memory and define a global threshold beyond which the system is declared overloaded. The threshold may be defined as a percentage of the total amount of memory allocated to the JVM heap. An example of this will be described in detail hereinafter.

The condition FLT_CND2 of filter 22 may define a CPU overload condition, by checking the current load rate of the server and rejecting requests if a "sweet-spot" performance rating is exceeded. The "sweet-spot" will be described in more detail hereinafter.

The arrangements of FIGS. 3 and 4 make it possible to record and prevent overload conditions to happen in production environments, like the one of FIG. 1.

In an example, server 1 is a Portal Server. Overload of such a server is undesirable because it prevents the system from running at optimum level, and imply poor user experience because of performance degradation. This issue is an important recurrent concern for those portal sites that are exposed to high user load (especially during peak hours) which exceed the capacity of their portal infrastructure.

As already noted, certain types of servers, e.g. directory servers or message servers, perform basic operations which are known in advance, both in number and nature. The average time needed for each task the server may perform is known in advance, at least approximately. Thus, servers of that type have predictable performance rating. In those servers, a potential overload situation may be anticipated by observing from outside the number and/or nature of the requests that the server receives. This may be called "intrinsic overload management", referring to the fact the overloads are managed from the traffic of requests itself. In other words, the server performance and capacity rating may be established outside of the running server instance.

Other servers (or server functionalities) do not have predictable performance rating in that it is generally not possible to foresee a potential overload from the flow of incoming requests. Examples of such servers are application servers and portal servers: in an application server, the time needed for the server to execute a given application may vary considerably; in a portal server, the time needed to render a given web page available is also much variable, depending for example upon the number and nature of the channels being contained in that page. Such servers in fact "aggregate" a variable number of individual tasks. Thus, an "intrinsic overload management" is generally not feasible and/or not satisfactory with these servers.

Thus, establishing a performance and capacity rating outside of a running Portal Server instance is generally not realistic because each portal site has its own signature, that is dependent on the desktop customization, and other external factors affecting performance. This problem may be addressed by implementing an Overload Management System as an additional software layer built on top of server 1.

Generally, the main cause for overload conditions is resource depletion. In Portal Server, two resource depletion situations have been identified:
  JVM heap space depletion, and
  CPU bandwidth depletion.
As it will be seen below, the proposed solution may handle anyone of these resource depletion situations, or both, if desired. When the server is operated beyond its capacity limits, the Overload Management System may reduce user traffic by way of "gracefully" rejecting service requests using e.g. the HTTP error code 503 (server busy), until enough resource is reclaimed on the server to resume with normal operation.

Figure 5:
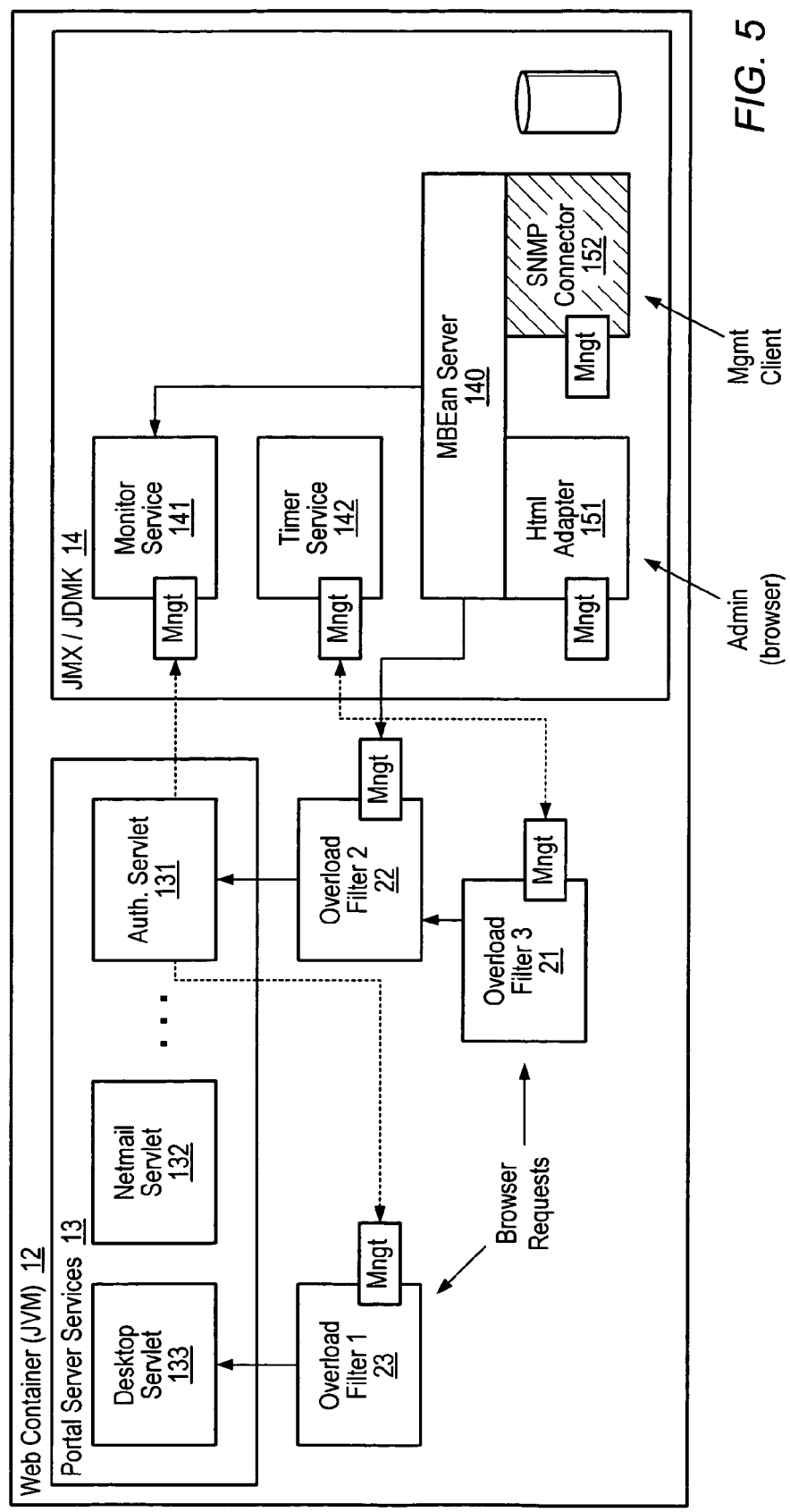
FIG. 5 represents the various components of an overload Management System Architecture, in an exemplary embodiment.

FIG. 5 shows the various components of an Overload Management System Architecture, in an exemplary embodiment, which is applicable e.g. in a Portal Server, like the Sun ONE Portal Server 6.0 which is to be released. This embodiment is based on two Java standards:

Java Management Extensions 1.1 (JMX)
Java Servlet 2.3 Filters which are part of J2EE However, similar functionality may be obtained on the basis of a different environment.

In FIG. 5, the Java virtual machine or JVM 12 acts as a web container, which may comprise one or more server services 13, implemented e.g. in the form of servlets. In the example of a portal server, services 13 may comprise for example an authentication servlet 131, a netmail servlet 132, and a desktop servlet 133.

Practically, the Overload Management System may be implemented in the form of one or more overload manager objects or servlet filters, which may (or may not) be applicable to each of the services 13. They intercept requests to Portal Server's services, and grant or deny access depending on the actual level of resource availability in the system. Generally, a Memory Overload Filter intercepts requests to Portal Server services, controls the status of memory resource, and reject requests if not enough memory is available in the JVM heap. A CPU Overload filter executes the same logic for CPU resource.

As known, a servlet filter is an object that can transform a request or modify a response. Filters are not servlets; they do not actually create a response. They are preprocessors of the request before it reaches a servlet, and/or postprocessors of the response leaving a servlet. In summary, filters are used to:

Intercept servlet's invocations before the servlet is called;
Examine a request before a servlet is called;
Modify the request headers and request data by providing a customized version of the request object that wraps the real request;
Modify the response headers and response data by providing a customized version of the response object that wraps the real response.

FIG. 5 shows a plurality of servlet filters, which may belong to two different types:

The Memory Overload Filter;
The CPU Overload Filter.

In the example, the Memory Overload Filter 21 may intercept requests to Portal Server authentication service 131, control the status of the JVM heap, and reject new session requests if the actual amount of used memory exceeds a certain threshold.

On another hand, Netmail is not filtered by any overload filter in the diagram of FIG. 5. However, it might be filtered as well. Other Portal services could be added in that framework, together with corresponding MemoryOverload and/or CPUOverload filters, as desired.

Generally, the overload filters MBeans intercept requests to Portal Server. Zero or more such filters can be mapped to each portal service servlet. For instance, in this diagram two different filters are mapped to the authentication service. The order in which filters are executed may be predefined (e.g. in the deployment descriptor web-apps.xml, to be considered hereinafter).

To ease dynamic interaction with the Overload Management System, overload filters may be implemented as JMX MBeans (Management Beans), based on a JMX/JDMK environment 14, having an MBean server 140, a monitor service 141, and a timer service 142.

Thus, the Overload Management System of FIG. 5 implements the overload filters as management beans or MBeans. In JMX terms, a MBean is a manageable resource which can expose its methods and attributes to other MBeans or a management console via a JMX protocol adapter and connector. Optionally, the system may also comprise a JMX HTML protocol adapter 151 and/or an SNMP connector 152.

Thus, in addition to servlet filters, the Overload Management System uses the services provided by the Java Management Extensions (JMX). JMX offers timer and monitoring services that are largely leveraged in server implementations. JMX also embeds a variety of tools to monitor objects' attributes, create gauges and counters, and receive notifications when a gauge or counter exceeds a certain threshold.

In addition to these services, JMX protocol adapters/connectors may be used to enable administrators to tune parameters such as threshold notification, receive alerts, and visualize various metrics from an HTML or SNMP system management console. They may also be used to enable an administrator to interact with the Overload Management System at run time. In particular, it allows an administrator to change the setting of a gauge monitor threshold, and visualize resource consumption metrics.

JMX is useful in that implementation since the filters rely on the timer and monitor services of JMX; also, JMX services and the optional protocol adapters/connectors allow for MBean management. However, the HTML adapter and SNMP connector are optional.

It will be appreciated that, in FIG. 5:

All components are contained in the same web container's JVM;
An HTML Adaptor may allow a web browser to access MBeans' management interface;
JMX services and protocol connectors/adapters are all standard Mbeans;
An overload filter has two implementation classes: one generic for all overload filters and one specific for the overload assessment logic. This specific class is called collector. However, this distinction in two classes is optional, and the Overload filters might alternatively be instanciated from one class only, or from more than two classes.

In accordance with the object model, a plurality of OverloadFilter instances may be derived from a common OverloadFilter class. This defines a generic Overload Filter adapted to reject user requests when the system runs out of resources.

Figure 6:
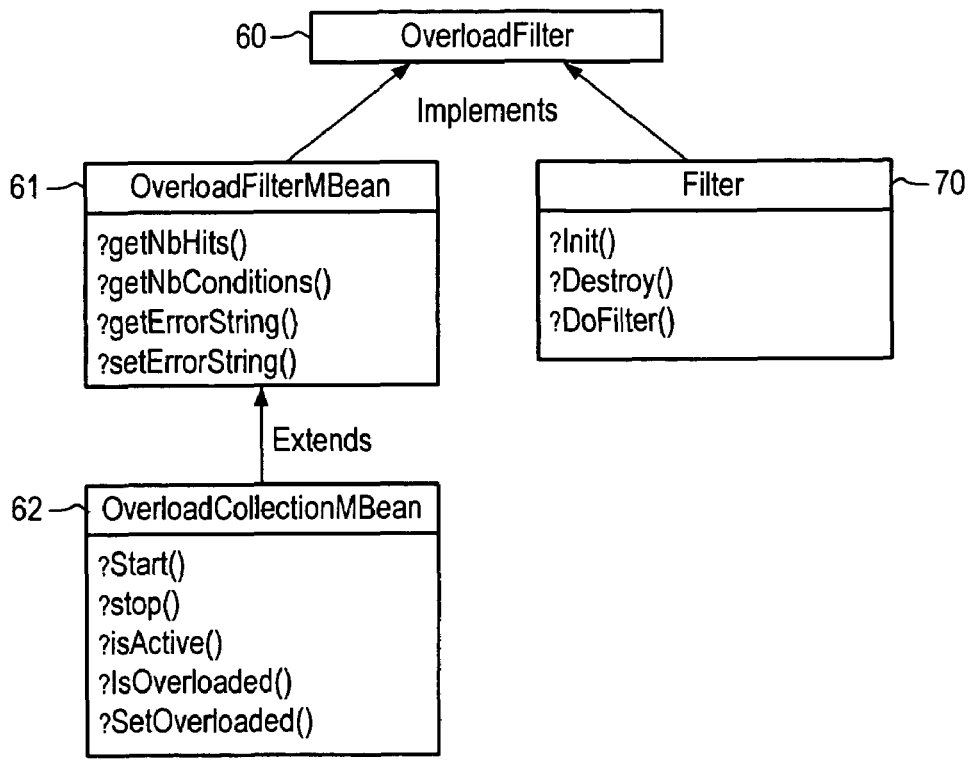
FIG. 6 is a diagram representing an exemplary Overload filter class and its interfaces.

FIG. 6 shows an exemplary OverloadFilter class 60 and its interfaces, together with their relationships:

Regardless of the type of resource being monitored, an OverloadFilterMBean interface 61 exposes a generic JMX management interface to the management application. The OverloadFilterMBean interface 61 extends an OverloadCollectorMbean interface 62.
a filter interface 70.

Filter interface 70 may be a Javax.servlet.Filter interface, whose detail is indicated in Table E.B1 in Exhibit B. Basically, as exemplified in E.B2, the OverloadFilterMBean interface 61 allows administrators to access generic resource usage metrics and current status of the filter. As exemplified in E.B3, the OverloadCollectorMBean interface 62 defines management methods that are specific to the overload assessment and resource management logic.

In short, the interface elements may be described as follows (see section A3 of Exhibit A for the concepts of attribute and operation):

The Active attribute indicates that the filter has been started and is actually filtering requests.

The ErrorString attribute is the HTML error string returned along with HTTP error 503.

The string can be modified at run time.

The NbConditions attribute indicates the number of overload conditions registered on that filter.

The NbHits attribute gives the number of hits registered on that filter.

The Overloaded attribute indicates whether the filter is in the overloaded state or not.

The Start and Stop operations enable or disable the filter and associated overload assessment functions at run time.

Acting as a common denominator to all overload filters, the OverloadFilter class does little with respect to data gathering and overload assessment. This class may be viewed as a management facade which delegates the real work to a specialized class called collector.

Figure 7:
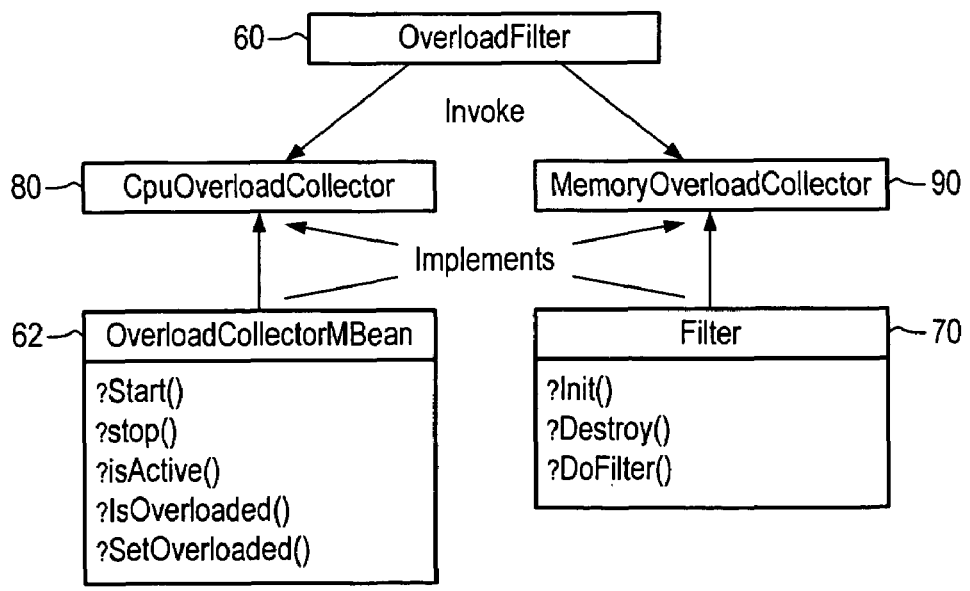
FIG. 7 shows the relationships between an overload filter and a collector.

FIG. 7 shows the relationships between the overload filter and the collector(s). A CpuOverloadCollector class 80 is responsible for CPU overload assessment logic. A MemoryOverloadCollector class 90 is responsible respectively for memory overload assessment logic.

As for the OverloadFilter class, collectors 80 and 90 implement the javax.servlet.Filter interface 70 and the Overload CollectorMBean interface 62 which expose the same common management interface.

Figure 7A:
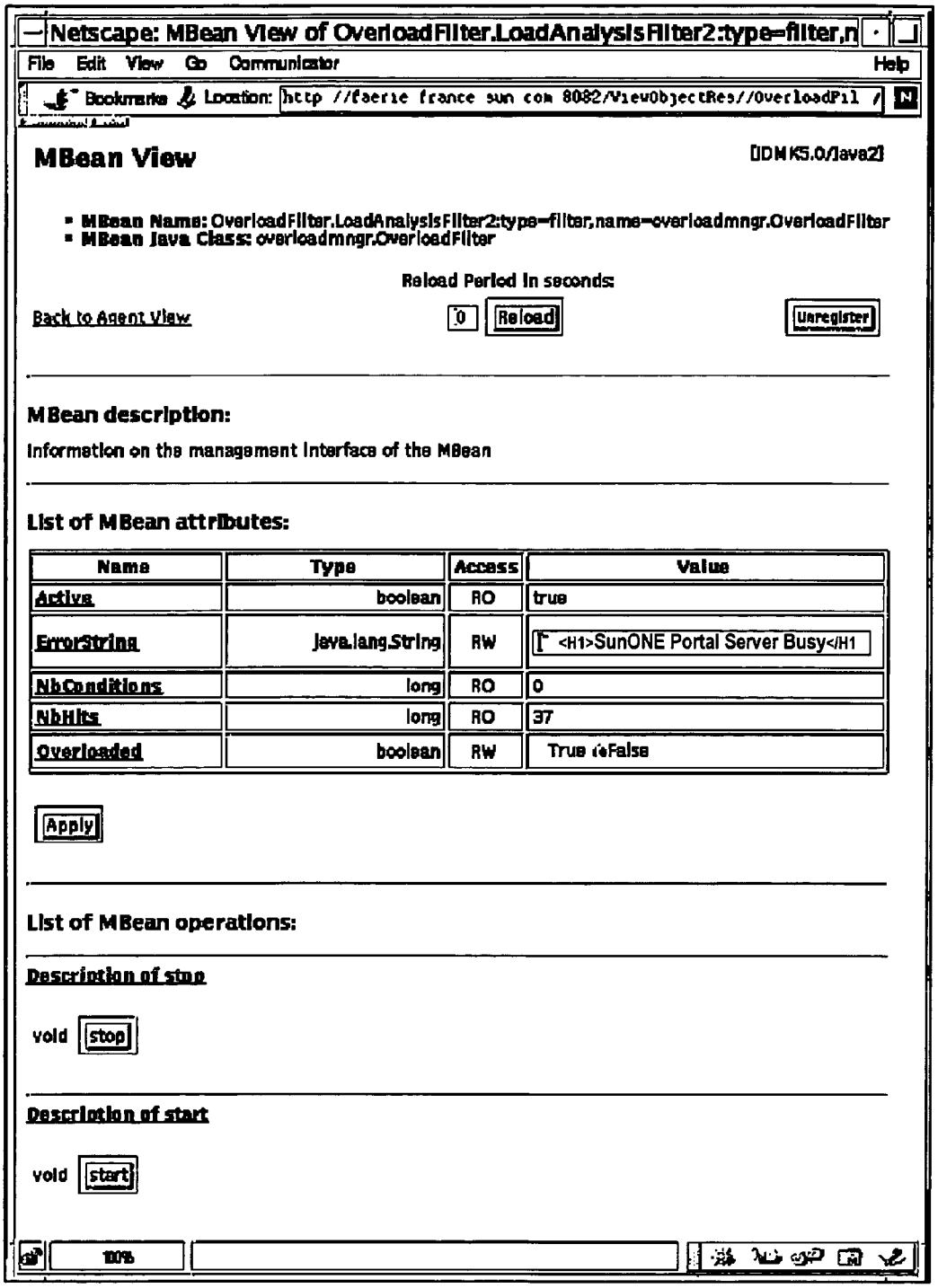
FIG. 7A is an exemplary HTML Adaptor view of a generic Overload Filter Mbean.

FIG. 7A is an exemplary HTML Adaptor view of the generic Overload Filter MBean of FIGS. 6 and 7.

In the above, it has been recognized that memory overload and CPU overload may be major sources of resource depletion, although possible other causes of resource depletion may exist, and be processed as well.

The invention therefore proposes a method and a device for managing overload in a server system, having a service operating in response to input requests, and a server operation parameter related to the operation of the service. The server operation parameter may be related to memory usage when the method and the device are dedicated to memory overload management. Alternatively, the server operation parameter may be related to the server throughput and the server latency when the method and the device are dedicated to CPU overload management.

The case of Memory Overload will now be considered in more detail. The case of Memory Overload, the server parameter operation represents a quantity related to the memory usage in the server.

Figure 8:
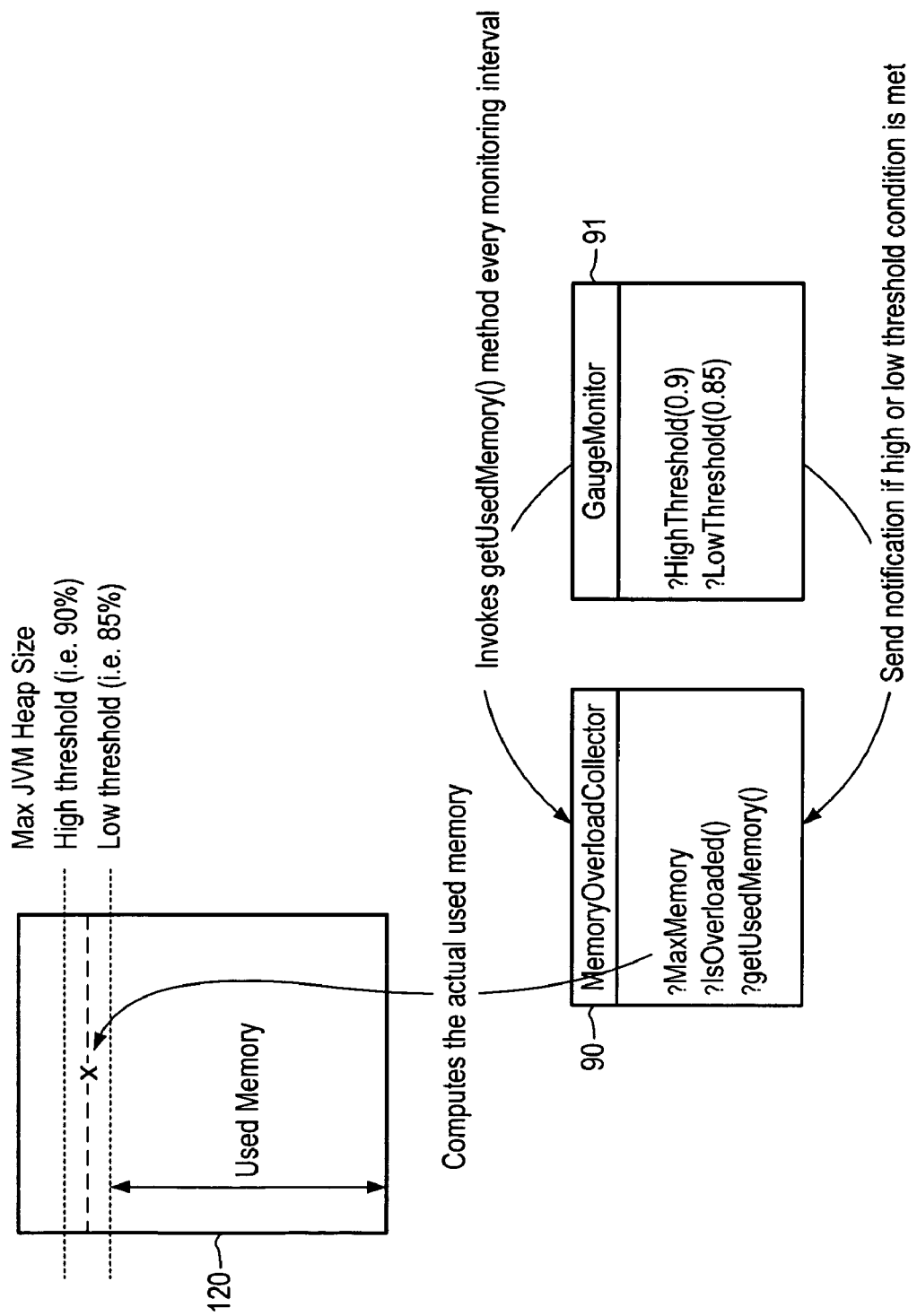
FIGS. 8 and 9 are diagrams illustrating the monitoring of JVM (Java Virtual Machine) heap.

Reference is made to FIG. 8, which shows the monitoring of the JVM heap. Examples of code related to Memory overload are shown in code section E.C1.

The usage rate of the JVM heap memory is accessed using a getUsedMemory( ) method, whose code may be as shown at code section E.C10 in Exhibit C. Functions like rt.totalMemory( ) and rt.freeMemory( ) are calls to standard Java SDK.

In code example E.C10, the IF clause in code sub-section C acts as follows: when a low memory situation occurs, the garbage collector rt.gc( ) of the JVM may be called several times until more memory held by unreferenced objects is reclaimed; if so, the memory occupation usedMemory is recalculated at the end. The running objects finalization method rt.runfinalization( ) may be perceived as too intrusive in the Java environment hence potentially creating unwanted side effects on the application.

The operation of a Memory Overload Filter will now be described.

With reference to FIG. 8, MemoryOverloadCollector 90 uses a gauge monitor service 91 provided within monitor services 141 of the JMX environment, and based on timer services 142 (FIG. 5).

Broadly, successive values of the quantity related to a memory usage in the server, or usedMemory values, are monitored by a monitoring function of the Memory Overload Filter. These values are accessed with the getUsedMemory( ) method described above.

A first logic function may evaluate a first condition, which involves whether a current usedMemory value passes a first threshold value in a first direction or high threshold value. This high threshold value may be represented by the maxMemory attribute multiplied by a high percentage value (e.g. 90%). If the usedMemory value exceeds the high threshold value, a "high threshold" notification is sent to the collector. The fact that a "high threshold" notification has been sent is stored;

Further a second logic function may evaluate a second condition which involves wether a current usedMemory value, lies below a second threshold in a second direction, or low threshold, with the second direction being opposite to the first direction, and extending from the first threshold value to the second threshold value. This low threshold may represent the maxMemory attribute multiplied by a low percentage value (e.g. 85%).

The verification of the second condition may therefore be performed within a time period starting upon verifying the first condition, and terminating upon verifying a fourth condition.

Figure 9:
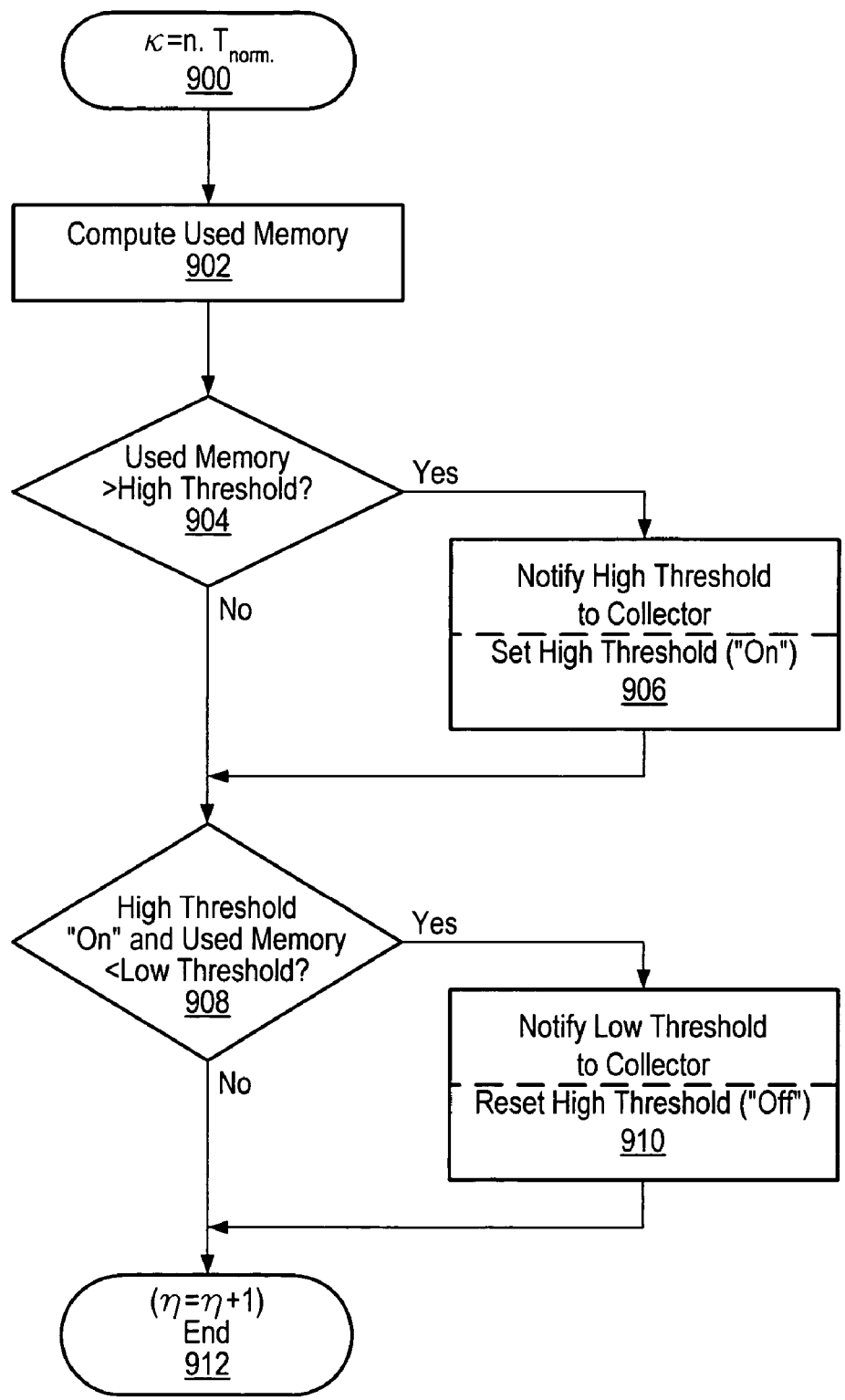

The memory overload management method will be described hereinafter in more details, with reference to FIGS. 8 and 9.

The memory overload is checked at a first rate defined by a memory monitoring time period Tmm. This memory monitoring time period Tmm is monitored by services 141 and 142. It triggers at operation 900.

Operation 902 then computes a usedMemory value, e.g. by querying the getUsedMemory( ) method of collector 90.

Then, at operations 904 and 906 a "high threshold" notification is sent to the collector, when a third condition is verified which is related to the verification of at least one of the first and second condition.

In particular, the third condition may only comprise the fact that the first condition has been verified, i.e. that the usedMemory value returned exceeds maxMemory attribute multiplied by the high percentage value (e.g. 90%).

Alternatively, the third condition may comprise the fact that the second condition has not been verified during a grace period after the first condition has been verified. Thus the third condition will be verified if the usedMemory value never crosses the low threshold during a grace period starting upon verifying the first condition. During the grace period, the second condition may be checked at an accelerated rate or second rate which is not lower than the rate defined by the monitoring time period.

Upon receiving a high threshold notification, the collector 90 raises the overload flag for the filter. Raising the overload flag means that the is Overloadedo method now returns true. As already mentioned, requests directed to the corresponding servlet will then be denied by the access control function, until the overload flag is reset.

Generally, the "high threshold" may be defined as a percentage of the total amount of memory allocated to the JVM heap. This value may be defined in the jvm.maxHeapSize parameter of the web container's jvm12.conf configuration file.

At operations 908 and 910, a "low threshold" notification is sent to the collector, and the "high threshold" internal flag of Gauge monitor 91 is reset, if a fourth condition related to the second condition is verified.

When the third condition only comprises the fact that the first condition is verified, this fourth condition may only comprise the fact the second condition has been verified. Therefore, the "high threshold" internal flag is reset when the current usedMemory value crosses the low threshold (maxMemory attribute multiplied by the low percentage value) in the case where a grace period is not involved in the third condition.

Alternatively, when the third condition comprises the fact that the second condition has not been verified during a grace period after the first condition has been verified, the fourth condition may comprise the fact the second condition has been verified after the third condition has been verified. Therefore, the "high threshold" internal flag is reset when the current usedMemory value crosses the low threshold (maxMemory attribute multiplied by the low percentage value), in the case where a grace period is involved in the third condition.

Upon receiving a low threshold notification, the collector 90 reset the overload flag for the filter. Requests directed to the corresponding servlet will then be accepted by the access control function, until the overload flag is set up again.

When a grace period is involved, the JMX gauge monitor 91 implements a so-called hysteresis mechanism, which means that notifications are sent only once when the high or low threshold is crossed for the first time. As a result, a fluctuating value around the threshold will not cause repeated notifications to the collector. It will be appreciated that the low threshold is a tool to this effect. However, it may have a further role. For example, calling the getUsedMemory( ) with the low threshold causes garbage collection to occur when the low threshold is reached.

Those of the services in the server that need Memory Overload filtering may be determined from observing the server behavior. In the case of a portal server, the following observations have been made:

Not all portal services need to be filtered against memory overload. A typical example is the desktop since desktop uses cached data to deliver the content, and do not normally require additional memory to complete.

by contrast, the Memory Overload Filter should be mapped to those of the portal services that drive session objects creation. Thus, the Memory Overload Filter prevents the creation of new sessions when the server runs out of memory, but allows existing sessions to continue to run in the portal server normally.

Accordingly, as shown in FIG. 5, a Memory Overload Filter may be attached to the Identity Server authentication service. Thus, in an example, by mapping the Memory Overload Filter to the /amserver/login URI (Filter mapping to the authentication service URI is described in the web-apps.xml deployment descriptor), the system may ensure that the overload filter will not interfere with ongoing desktop requests.

Other servers that do not have predictable performance rating comprise server applications, in particular webs applications that use a session such as web store or "cookie". Although the Memory Overload Filter is useful, it may not need to be enabled or even to be implemented, e.g. in servers whose memory is largely sized.

The case of a CPU Overload Filter will now be considered.

In the case of a CPU Overload Filter, the server operation parameter represents a quantity related to the server throughput and to the server latency. More particularly, the server operation parameter is derived from a given combination of the server throughput with the server latency.

The goal of the CPU Overload Filter is to avoid performance degradation (increase of the response time) due to an excessive user load. Generally, when a Portal Server experiences a load that exceeds its capacity, the overload filter will reject user requests using the HTTP error code 503 until load returns to a manageable state.

Now, direct measurement of CPU activity is not practically feasible from within a Portal Server. Also, it may not be a good indicator of the system health. In fact, performance degradation can occur before CPU utilization "maxes out" for several reasons:

Networking environment including I/Os, content retrieval, and accesses to profile/policy database, Desktop configuration, Scalability limits.

As a result, the "CPU Overload Filter" cannot rely solely on CPU usage observation to do its overload assessment job. In fact, the CPU Overload Filter does not look at CPU utilization directly at all, as it will be seen below. (In this regard, the name "CPU Overload Filter" is somewhat misleading).

Another complexity element regarding CPU Overload management is the lack of established performance rating for a Portal Server and web applications. Each deployment has its own performance and capacity signature depending essentially on the desktop customization.

Figure 10:
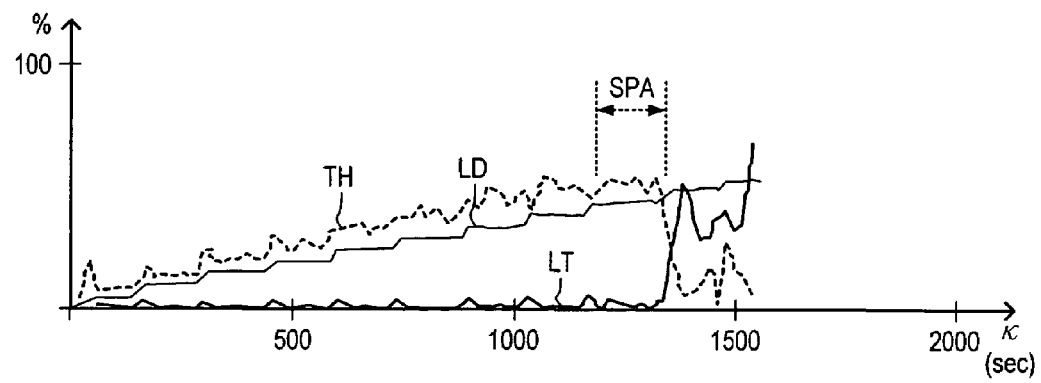
FIG. 10 illustrates the behavior of a portal server under increasing load.

The applicant company has observed the behavior of a portal server under increasing load. That behavior is illustrated in FIG. 10, in which the abscissa is time in seconds, and the ordinates are relative parameters expressed as percentages, with:

stepped curve LD being an increasing load size parameter, dotted curve TH representing the number of successful transactions per second or throughput, and lower curve LT indicating the transaction time, or latency.

Firstly, it is visible that after 1400 seconds of execution, the server collapses because of an excessive user load.

Now, from applicants observation, performance analysis of a given portal server shows a consistent pattern in throughput (ST) and latency (LT) response under load, which suggests that a dynamic performance rating could be established regardless of the external factors. That dynamic rating will be referred hereinafter as "performance sweet-spot discovering". Sweet-spot discovering may be defined as the finding of a point—within a portal server performance response curve—where the server can perform the highest throughput for the lowest latency.

In fact, this point is an area, which is diagrammatically illustrated as SPA in FIG. 10.

Another potential characteristic of the sweet-spot is a run queue length of zero, showing that in principal the server can absorb that level of load on a continuous basis for as long as necessary. In other words, no requests stacking is taking place in the server. By contrast, beyond the sweet-spot the server starts stacking requests. As a result, response time increases regularly up to a point where the server may stop responding.

Figure 11:
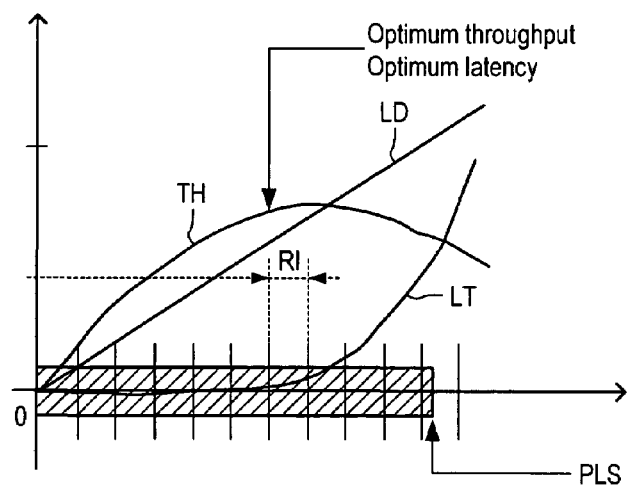
FIG. 11 shows a process life span break down obtained from a load generation program.

FIG. 11 shows an exemplary Process life span break down obtained from a load generation program. As shown, the process life span, represented in the abscissa axis between 0 and PLS, may be divided into small configurable time intervals RI, named "rollover intervals", corresponding to a performance sampling period of several seconds.

FIG. 11 represents the evolution of the throughput TH and the evolution of the latency LT with respect with the load LD generated.

It may be observed that the throughput TH reaches a highest value (hereinafter called optimum throughput OPT_TH) and the latency LT reaches a lowest value (hereinafter called optimum latency OPT_LT) at a critical point representing the sweep-spot and then both follow a degraded evolution beyond the sweet-spot, while the load LD increases.

Therefore, by scanning the CPU operation to detect when the sweep-spot is reached, it would be possible to prevent the throughput from decreasing and the latency from increasing. As illustrated by FIG. 10, such anticipation would be made possible by refusing requests (i.e. reducing the load) as soon as the sweep-spot is detected.

Thus, it has been discovered that a CPU Overload Filter may be designed to establish such a dynamic performance rating after the sweet-spot. The associated performance metrics may be defined as:

optimum throughput for the highest number of hits observed at that point, optimum latency for the lowest latency observed at that point The operation of a CPU Overload Filter will now be described.

The detailed structure of an exemplary CPU Overload Filter is shown in Tables E.B4-1 through E.B4-3 of Exhibit B.

Broadly, the CPU overload Manager comprises a monitoring function for evaluating successive values of the CPU server operation parameter which is related to the server throughput and to the server latency.

A load parameter, e.g. the load rate, of the system may further be monitored. This load rate represents the ratio of a reference value of the operation server parameter PerfSweetSpot to the server operation parameter PerfCurrent. The reference value of the server operation parameter PerfSweetSpot is related to the sweet-spot.

More specifically, the server operation parameter PerfCurrent is derived from a given combination of the current value of the server throughput CurrentThroughput with the current value of the server latency CurrentLatency. The reference value of the server operation parameter is derived from a combination of a reference value of the server throughput OptimumThroughput with a reference value of the server latency OptimumLatency.

The load rate CurrentLoad of the system is accessed using a getCurrentLoad( ) method, which may comprise the code indicated in code section E.C26 of Exhibit C. The getCurrentLoad( ) is part of the collector E.B4-3. In that code, the method getThroughput( ) and getLatency( ) are designed to return values of the throughput and latency, respectively, averaged for a current sampling period. The filter maintains counters during the sampling period for measuring the number of requests and the average processing time. The value of latency corresponds to the average processing time measured. The values of throughput is evaluated as the number of requests measured divided by the number of seconds contained in the sampling period.

The CPU overload management device also comprises a first logic function for evaluating a first condition, which involves whether the load parameter CurrentLoad crosses a high threshold value and a second logic function for evaluating a second condition, which involves whether the server operation parameter PerfCurrent crosses a low threshold value.

In the following description, the low threshold value will be 0 and the high threshold value will be 1, by way of example only.

Thus, a current load rate comprised between 0 and 1 means that the system is not overloaded. A current load rate greater than 1 means that the system is overloaded.

Actually, as the load rate CurrentLoad is the ratio of a reference value of the operation server parameter PerjSweetSpot to the server operation parameter PerfCurrent, the verification of the first condition involves that the server operation parameter PerfCurrent has passed a first threshold value in a first direction. The first threshold corresponds to the reference value of the operation server parameter PerfSweetSpot divided by the high threshold value. Similarly, the verification of the second condition involves that the server operation parameter PerfCurrent has passed a second condition, in a second direction, with the second direction being opposite to the first direction, and extending from the first threshold value to the second threshold value. The second threshold corresponds to the reference value of the operation server parameter PerfSweetSpot divided by the low threshold value.

The load rate CurrentLoad is checked by the gauge monitor at every monitoring interval (by default 30 seconds), which defines a first rate. The first condition is also checked by the gauge monitor at each monitoring interval. The second condition is checked by the gauge monitor at a second rate, not lower than the first rate. The second condition may be checked by the gauge monitor within a time period starting upon verifying the first condition, and terminating upon verifying a fourth condition that will be described below.

Figure 12:
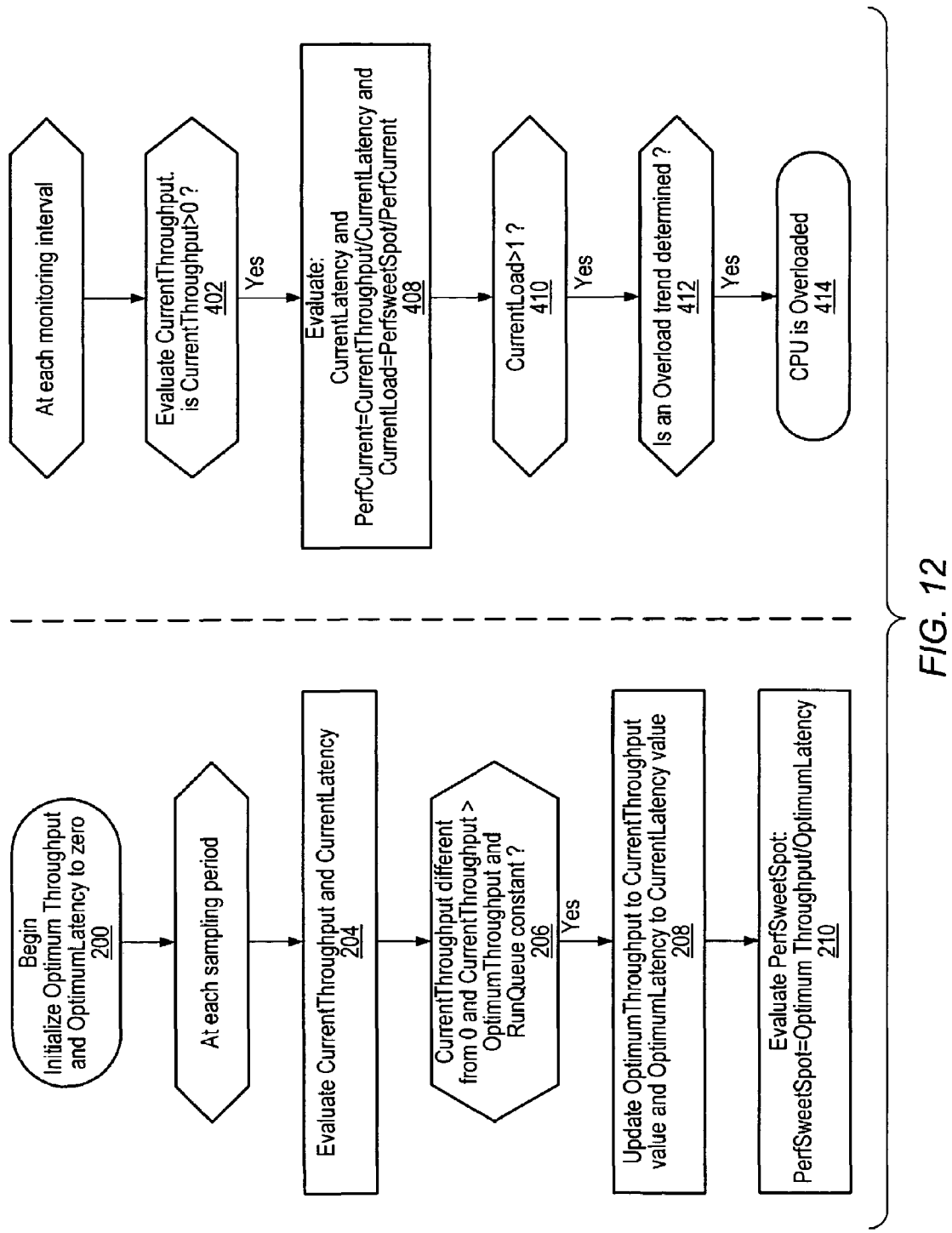
FIG. 12 is a twin flowchart showing the main operations of the CPU Overload Filter mechanism.

FIG. 12 is a twin flowchart showing the main operations of the CPU Overload Filter mechanism.

The leftmost portion of the flowchart of FIG. 12 is performed by the collector for tracking the "sweet-spot", which results in the perfSweetSpot value (perfSweetSpot in the code).

As explained above, the process life span is divided in small configurable time intervals, the rollover intervals, each rollover interval corresponding to a performance sampling period of several seconds (by default 10 seconds). Operations 204 through 210 of the leftmost portion of FIG. 12 are executed at each "rollover" time interval (or sampling period), which defines a third rate that is not lower than the first rate defined by the monitoring period. Thus, current throughput and current latency are checked by the collector E.B4-3 at the end of every rollover interval.

The rightmost portion of the flowchart of FIG. 12 is performed by the gauge monitor which transmits a notification if the value of the current load crosses the high threshold (high notification) or the low threshold (low notification).

More specifically, at every monitoring interval (by default 30 seconds), the gauge monitor evaluates the current load CurrenLoad and verifies if the CPU is overloaded from this value. This is achieved by testing whether a third condition, related to the verification of at least one of the first and second conditions is verified and if so the input requests are rejected by the access control function. The access control function stops rejecting the input requests upon verification of a fourth condition, related to the verification of the second condition.

The third condition may comprises the fact that the first condition has been verified. Therefore, the input requests will be rejected upon verifying that the load rate value CurrentLoad crosses the high threshold. In that case, the fourth condition may comprise the fact the second condition has been verified. Therefore the rejection of input requests will terminate, when it is verified that the CurrentLoad value crosses the low threshold.

In an alternative embodiment, the third condition may comprise the fact that the second condition has not been verified during a configurable grace period starting after the first condition has been verified. Therefore, the input requests will be rejected upon verifying that the load rate value CurrentLoad crosses the high threshold, and that within a grace period starting after this verification, the CurrentLoad value does not cross the low threshold.

In that case, the fourth condition comprises the fact the second condition has been verified after the third condition has been verified. Therefore, the rejection of input requests will terminate, when it is verified that the CurrentLoad value crosses the low threshold after the time at which the third condition is verified. The following description will be made in reference with this alternative embodiment, by way of example.

Reverting to the leftmost portion of FIG. 12, the collector comprises a tracking function that performs the operations 200 through 210 to maintain a reference value of the server throughput OptimumThroughput and a reference value of the server latency OptimumLatency. These reference values Optimum Throughput and OptimumLatency are updated upon verification of a fifth condition, comprising the fact that the current value of the server throughput CurrentThroughput does overlie its reference value OptimumThroughput. The reference value of the server operation parameter PerfSweetSpot is then derived from a combination of the server throughput reference value OptimumThroughput with the server latency reference value OptimumLatency. This combination is of the same nature as the given combination used to compute the server operation parameter PerfCurrent value.

In particular, the server operation parameter PerfCurrent value is derived from the ratio of the current value of server throughput CurrentThroughput to the current value of the server latency value CurrentLatency. Similarly, the reference value of the server operation parameter PerjSweetSpot is derived from the ratio of the server throughput reference value OptimumThroughput to the server latency reference value OptimumLatency.

As previously indicated the reference values Optimum Throughput and OptimumLatency are updated upon verification of a fifth condition, which comprises the fact that the current value of the server throughput CurrentThroughput does overlie its reference value Optimum Throughput. The fifth condition may further comprise the fact that the current value of the server latency CurrentLatency does not overlie its reference value.

Alternatively, the fifth condition may further comprise the fact that the server requests queue length RunQueue remains substantially constant.

A more detailed description will be made of the collector operation hereinafter.

Referring to the leftmost portion of FIG. 12, at the very beginning, the collector performs operation 200 to initialize optimum throughput OptimumThroughput and optimum latency OptimumLatency to zero.

Then at each sampling period, the collector performs operations 204 to evaluate current throughput (CurrentThroughput) and current latency (CurrentLatency).

A RunQueue parameter may also be evaluated by the getRunQueue( ) method, which comprises the code indicated in the code section E.C25 of Exhibit C. The RunQueue parameter corresponds to the number of outstanding requests (in processing and not yet returned to the client). A constant value of RunQueue means the server is not stacking requests.

The collector may use RunQueue parameter at operation 206 for checking the fifth condition. More specifically it checks:
 if current throughput (CurrentThroughput) obtained at operation 204 is greater than optimum throughput (OptimumThroughput), and
 if RunQueue is constant.

If both conditions are fulfilled, the collector sets OptimumThroughput to CurrentThroughput value and OptimumLatency to CurrentLatency value at operation 208. When optimum values are thus updated, the collector algorithm recalculates the reference value of the server operation parameter or sweet-spot rating PerfSweetSpot as the ratio of Optimum Throughput to OptimumLatency at operation 210.

Alternatively, the collector may use CurrentLatency parameter instead of RunQueue parameter, at operation 206, to check the fifth condition. In that case, it checks:
 if current throughput (CurrentThroughput) obtained at operation 204 is greater than optimum throughput (OptimumThroughput), and
 if current latency (CurrentLatency) obtained at operation 204 is lower than optimum latency (OptimumLatency).

However, using the condition based on RunQueue parameter, at operation 206, provides better results than using the condition based on Latency parameter, because RunQueue parameter is more stable than latency parameter which might fluctuate sporadically above its optimum value.

Referring to the rightmost portion of the flowchart of FIG. 12, the gauge monitor performs operations 402 through 410 to detect an overloaded state.

The gauge monitor may query the getCurrentLoad( ) method at every monitoring interval (default 30 seconds) to evaluate the current load CurrentLoad, defined as the ratio of the reference value of the server operation parameter perj SweetSpot to the current rating perfCurrent.

The getCurrentLoad( ) method, used to evaluate the current load CurrentLoad, comprises operations 402 and 408. The getCurrentLoad( ) method comprises the code indicated in the code section E.C26 of Exhibit C.

At operation 402, the getCurrentLoad( ) method evaluates the current throughput (CurrentThroughput) by querying the getThroughput( ) method and then checks if current throughput is superior to zero. The getThroughput( ) method comprises the code indicated in the code section E.C23 of Exhibit C.

If so, the getCurrentLoad( ) method further performs operation 408. At operation 408, the current latency is evaluated by querying the getLatencyo method and then a current rating perfCurrent is evaluated. The getLatencyo method comprises the code indicated in the code section E.C21 of Exhibit C. PerfCurrent corresponds to the ratio of the current throughput to the current latency.

Finally, the current load (CurrentLoad) is determined, as the ratio of perfSweetSpot to perfCurrent where perfSweetSpot has the current value that has been evaluated at operation 210 by the collector.

The gauge monitor then checks whether the third condition is verified. This is performed by checking if the current load exceeds 1 (high threshold) at operation 410 (first condition). If the current load exceeds 1, the gauge collector determines if an overload trend is established at operation 412 (second condition) and, if so, the gauge monitor finally positions an overload bit to overloaded state at operation 414.

Like the Memory Overload Filter, the CPU Overload Filter gauge monitor implements an hysteresis mechanism to determine if an overload trend is established at operation 412. It will be appreciated that the goal of the CPU Overload Filter is not to trigger an overloaded state for transient spikes of load. Preferably, the filter should only be tracking overload "trends" that span several monitoring intervals and raise an overloaded state only in that situation.

In order to accomplish that, the overload filter may differ the triggering of the overloaded state for the configurable grace period (default 1 minute). During the grace period, the monitoring interval of the gauge monitor is accelerated. If at the end of the grace period the filter has not received a low threshold notification from the gauge monitor (i.e. the second condition is not verified), the third condition is verified and the system is declared overloaded and input requests are rejected as long as necessary.

Thus, fluctuating value around the threshold will not cause repeated notifications so that the overloaded state remains up until the gauge monitor sends a low threshold notification to the collector. All parameters including rollover interval, monitoring interval, high and low thresholds are configurable at startup time and/or run time.

Figure 15A:
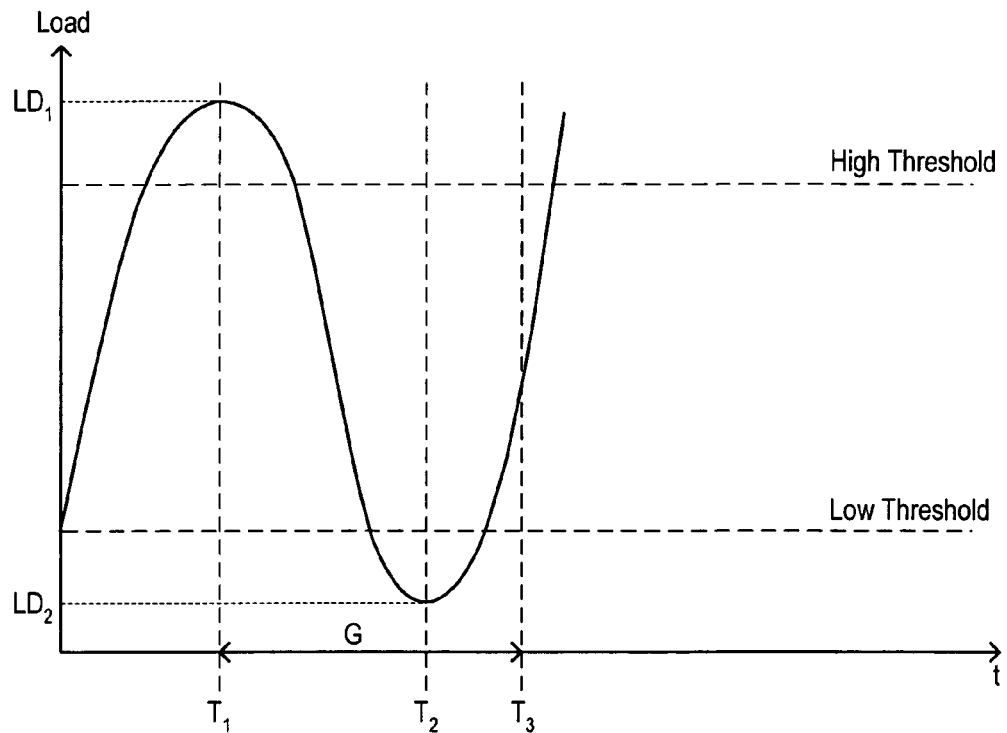
FIG. 15A through 15C represent exemplary evolutions of the load, illustrating the gauge monitor hysteresis mechanism.
Figure 15B:
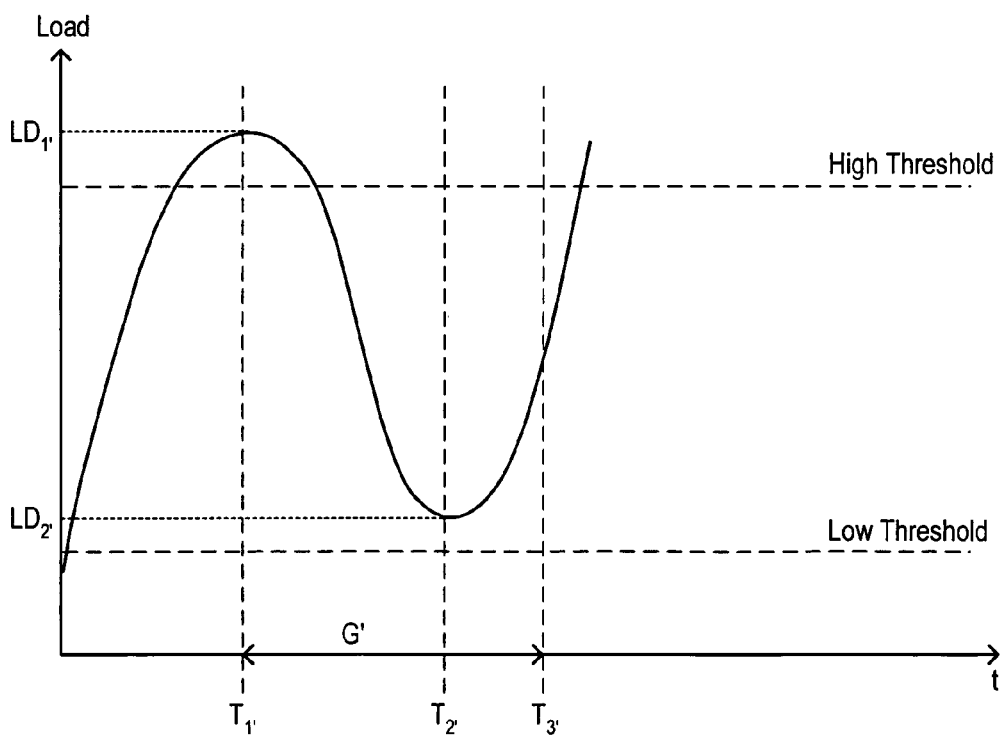
Figure 15C:
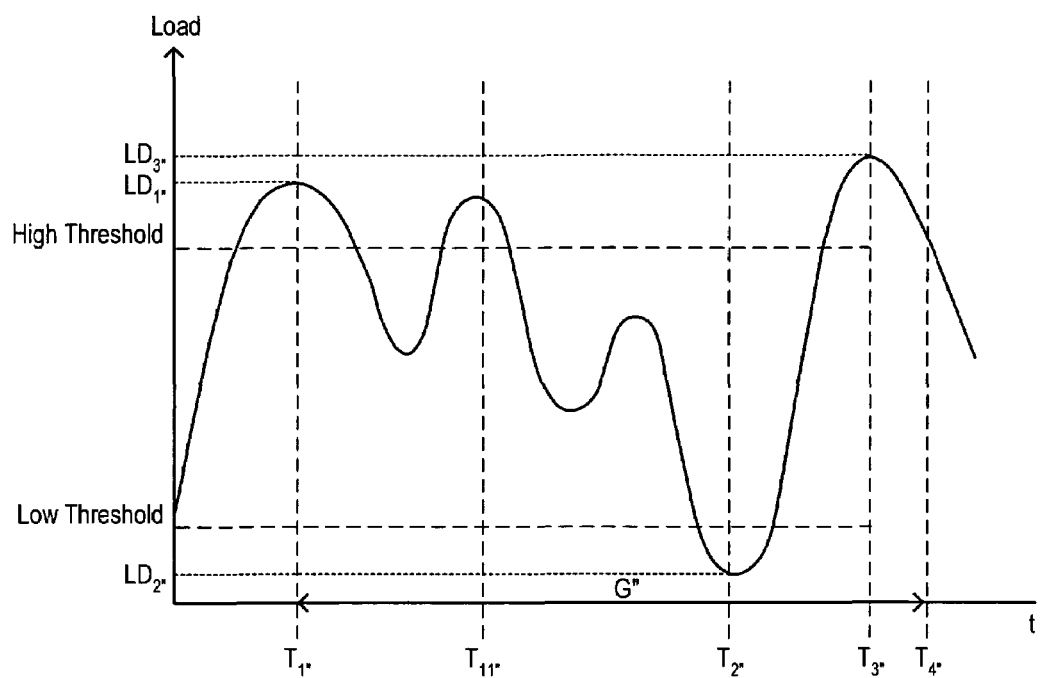

FIG. 15A through 15C represent exemplary evolutions of the load, illustrating the gauge monitor hysteresis mechanism. In FIG. 15A, the load first increases until reaching the load LD1 at time T1, where the gauge monitor sends a high threshold to the filter, because the high threshold has been crossed. The grace period G thus starts at T1 and ends at time T3. During the grace period the load decreases until reaching the load LD2 at time T2 (with T2<T3), where the gauge monitor sends a low threshold notification to the filter, because the low threshold has been crossed.

According to the example of FIG. 15A, the overload condition is canceled because the filter has received a low threshold notification during the grace period G.

In FIG. 15B, the load first increases until reaching the load LD1' at time T1', where the gauge monitor sends a high threshold notification to the filter, because the high threshold has been crossed. The grace period G' thus starts at T1' and ends at time T3'. During the grace period G' the load decreases until reaching the load LD2' at time T2' (with T2'<T3'), where the gauge monitor does not send a low threshold notification to the filter, because the low threshold has not been crossed.

According to the example of FIG. 15B, the overload condition is maintained because the filter has not received a low threshold notification during the grace period G'.

In FIG. 15C, the load first increases until reaching the load LD1" at time T1", where the gauge monitor sends a high threshold notification to the filter, because the high threshold has been crossed. The grace period G" thus starts at T1" and ends at time T4". During the grace period G', the load first decreases until reaching the load LD2" at time T2" (with T2"<T4"), where the gauge monitor sends a low threshold notification to the filter, because the low threshold has been crossed. Then, the load increases until reaching the load LD3" at time T3" (with T3"<T4"), where the gauge monitor sends a high threshold notification to the filter, because the high threshold has been crossed.

Note that no notification is sent at time T11" where the high threshold is crossed, because a high threshold notification has already been sent.

According to the example of FIG. 15C, the overload condition is maintained because, during the grace period G", the filter has received a low threshold notification followed by a high threshold notification.

Usually the system does not stay in overloaded state for long as, during that time, user requests are rejected, hence lowering the load substantially. Current throughput and hence current performance rate drop off to zero in few seconds after the condition was detected.

For at least some of the overload filters, when the system is in overloaded state, the monitoring interval may be accelerated (e.g. 2.5 seconds) to give a chance to the system to come back online quicker than with the regular monitoring interval. Accelerating of the monitoring interval is usually not a problem because the server is mostly kept busy with the overload condition catch up.

The CPU Overload Filter may further expose the GetRunQueue( ) method, which evaluates the number of outstanding requests (RunQueue parameter). Decision to additionally use this GetRunQueue( ) method may be defined in the Overload Management System configuration file, which will be considered hereinafter. Monitoring the outstanding requests queue length is simple, but may not provide the same quality of performance data feedback as the Currentload( ) method exposed above. Another difference is that a growing queue length does not reflect necessarily an overload condition. This can happen, for instance, when the desktop is stuck because one or more channels are trying to retrieve content from remote providers that are not responding. In that situation, the filter would interpret it as an overload condition whereas the system is not overloaded at all from a resource consumption standpoint. However, using the GetRunQueue( ) method together with the CurrentLoad( ) method may improve the CPU overload management system.

A typical control point to enforce CPU overload control is the desktop service. This can be achieved by mapping the CPU Overload Filter to the /portal/dt URI. (Filter mapping to the authentication service URI is described in the web-apps.xml deployment descriptor.)

Generally, in a server like a portal server (e.g. Sun ONE portal server), CPU resource depletion may be measured using the number of desktop requests processed per unit of time (processing throughput) and average response time (processing latency). A CPU resource depletion is characterized by an increase of the latency, and a decrease of the throughput. It is commonly interpreted as a performance degradation of the server.

Performance degradation can obviously occur independently of the memory resource depletion. Thus, both situations may have to be monitored for effective overload management.

The mapping of the Overload Filters to Portal Server services will now be described.

Mapping of the overload filters to Portal Server services may be defined in web-apps.xml descriptor. This file is not a standard J2EE deployment descriptor. It may be used to describe contexts for a set of Web applications running in a virtual server. The context information may include the context path of Portal Server web applications and other properties such as how it handles sessions management.

To enable the Overload Management System, one may edit the web-apps.xml descriptor file manually using the <filter> and <filter-mapping> tags as shown in sections E.C11-E.C12 and E.C27-E.C28 of Exhibit C.

The code in section E.C11 notifies the server that a filter named MemoryOverloadFilter is implemented in the overloadmngr. OverloadFilter class.

The code in section $C12 maps the registered filter to /login URL pattern of the servlet that is the authentication service. Requests sent to the authentication web application or amserver web application that match the /login URL pattern will be screened by the Memory Overload Filter. Alternatively, one could map the filter to the servlet using the <servlet-name> tag.

In code $C22, the <filter-mapping> tag maps the registered filter to /dt URL pattern of the servlet that is the desktop service. Requests sent to the /portal web application matching the /dt URL pattern will be screened by the CPU Overload Filter.

Installing the software may be made using a war file containing the jar files and configuration files, as known from experienced Java users. Once the war file is deployed, one needs to edit the jvm12.conf classpath parameter to add the Overload Management System jar files path, as known.

Optionally, one can enable the JMX HTML Adaptor to visualize the MBeans, by editing the desktop.properties file to add the two following lines:

perfAuditEnabled=true
htmlAdaptorPortNumber=8082 (for example)

Then, the server is restarted. The screen views in the drawing have been obtained through the HTML adaptor bound to port 8082.

The overload filters may be configured through properties. In an exemplary embodiment, there is one configuration file per overload filter containing initialization parameters. Exemplary configuration files are given in sections E.C28 and E.C13 of Exhibit C.

Some of the initialization parameters can be changed at run time through the JMX HTML adaptor, as it will now be seen.

Figure 13:
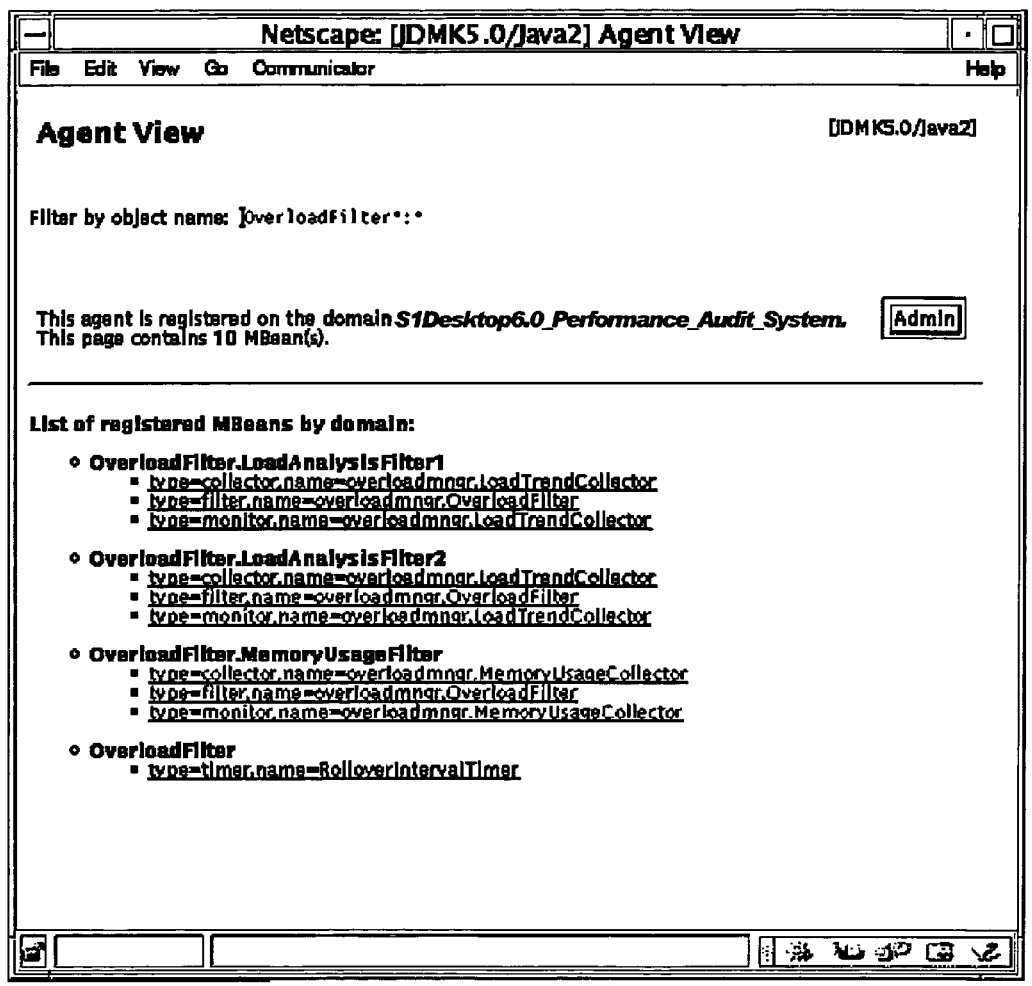
FIG. 13 is a JMX agent View of an exemplary CPU overload Filter Collector.

A browser may be used to open a Portal Server URL, e.g. on port 8082. One may then access the global agent view of all MBeans created in the system. The agent view may be filtered, using the filtering capabilities of the HTML adaptor. For instance, to only see the Overload Management System MBeans, the operator enters the expression "OverloadFilter*:*" into the "Filter by object name" text box. The corresponding view is shown in FIG. 13, which is a JMX agent View of an exemplary CPU overload Filter Collector. In the example, three MBeans are created per Overload Filter.

Figure 14:
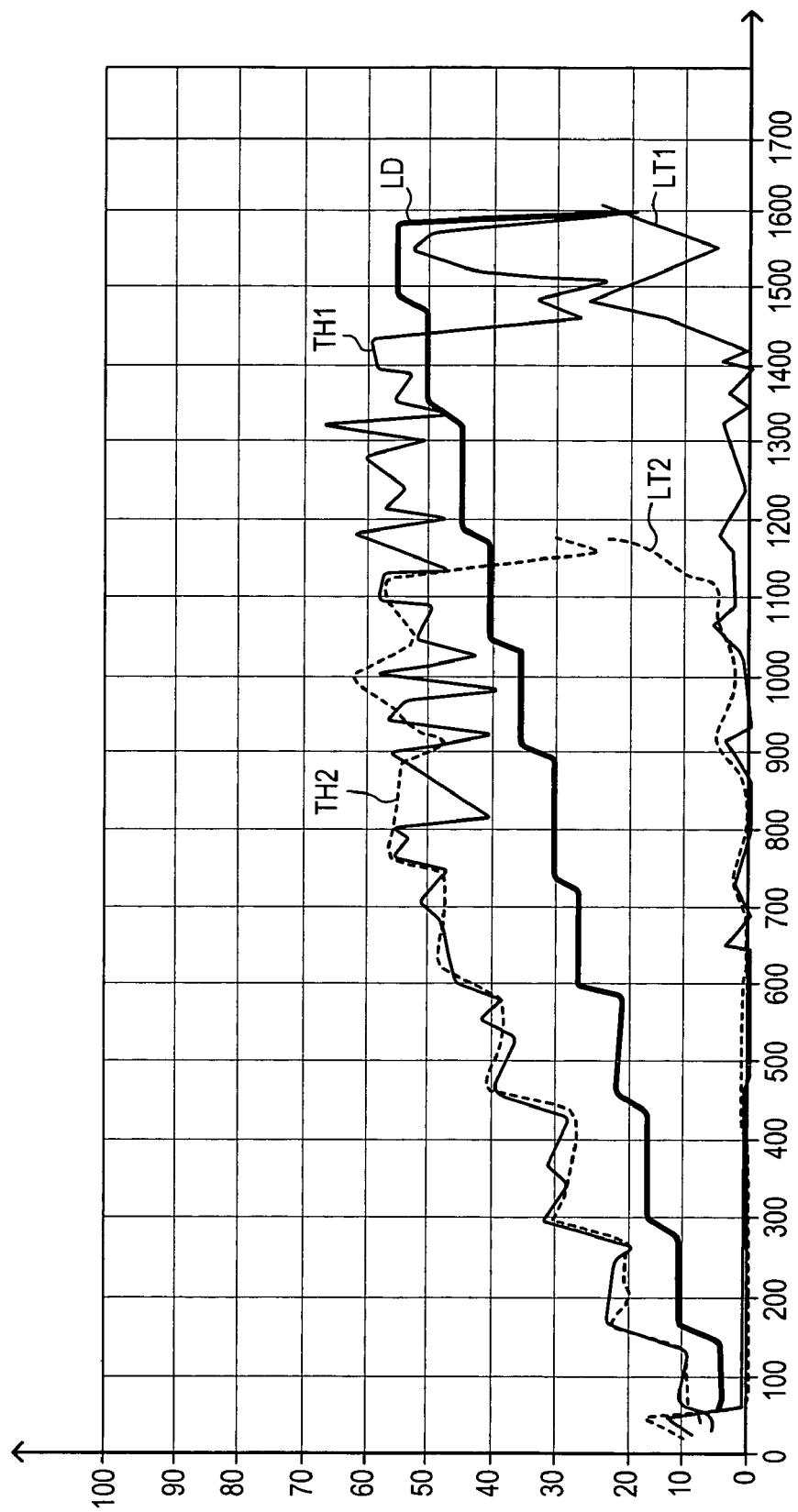
FIG. 14 is a graph illustrating the performance impact of the overload management system onto portal server operation.

The graph of FIG. 14 indicates that the performance impact of the Overload Management System onto Portal Server operation is negligible if even perceptible. The graph represents two identical load sessions; one is executed with the overload filter disabled, the other is executed with the overload filter enabled.

In the graph of FIG. 14:

the upper line TH1 corresponds to the transaction throughput, with the overload filter enabled, the lower line LT1 corresponds to the transaction latency, with the overload filter enabled, the upper dotted line TH2 corresponds to the transaction throughput, without the overload filter enabled, the lower dotted line LT2 corresponds to the transaction latency, without the overload filter enabled, and the middle line LD corresponds to the load.

With the overload filter enabled, the transaction throughput TH1 is maintained at the same rate as without the overload filter represented by the upper dotted TH2 until the server reaches its performance sweet-spot, which can be estimated at about 800 seconds after the starting of the load session. Beyond this performance sweet-spot, the overload management system allows Portal Server to keep up with the load (represented by the middle line LD), while maintaining a low transaction latency (represented by the lower line LT1), and yet spiky relatively constant transaction throughput TH1. Eventually the load session dies after 1400 seconds of execution due to a lack of memory in the system and a continuously increasing user load.

JMX is protocol agnostic and as such can inter-operate with a variety of standard management systems including SNMP and even Portal Server itself. For example, the product may be delivered with an SNMP MIB and SNMP protocol connector that allows the monitoring of the Overload Management System from a standard SNMP console.

Now, while an overload management solution has been described, based on Servlet Filters and Java Management Extension (JMX), a similar solution may be designed on a different basis, with the aid of the above description.

It is further noted that any of the embodiments described above may further include receiving, sending or storing instructions and/or data that implement the operations described upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Exhibit A—Java Based Concepts

A1—Object Oriented Programming

In object oriented programming, an object may comprise properties and methods, together termed [object] members. For convenience, the methods are usually identified by their name followed with ( ). Where a method requires parameters, these are inserted between the two round brackets. Most of the methods are directed to the members or internal contents of the object: get( ) for reading a property, set( ) for writing a property, other property-related methods, access to other methods, etc.

A method contained in an object may be inter alia public or private, depending upon whether it is accessible (may be invoked) from outside the object, or not.

As known, when using an object oriented programming framework, e.g. Java, defining object structures (properties and methods) is generally sufficient for enabling men skilled in the art to write corresponding executable software. Thus, generally, this specification will mainly present object structure definitions.

Object oriented programming uses "classes", which may serve the following purposes:

objects may be "instantiated" from a class, using an object constructor (in short, a constructor); in Java, a constructor is a method having the same name as the class it belongs to.

a class may "extend" a parent class, thus inheriting the properties and methods of the parent class.

A class termed "abstract" cannot be instantiated, only inherited. A class termed "concrete" may instantiated and/or inherited. A method in a class may also be abstract: this means that the method will have to be defined in any object instantiating that class.

A2—Java Classes and Interfaces

In Java, a given class may have only one parent class, which in turn may inherit ("extend") one parent class, etc. . . . Other object oriented languages may support multiple inheritance, i.e. a given class may inherit several parents.

However, Java supports a special type of entity, named "interfaces". Interfaces may be viewed as a special form of classes, which may support multiple inheritance. Interfaces may basically contain abstract methods. The word "interface" is used herein to refer to such entities. It covers any similar entities which may be developed in a language other than Java.

A class may "implement" an interface. This means that the class concretely defines the abstract methods existing in the interface.

A3—Java and Java Beans

Detailed information on Java and java beans may be found at:

http://Java.sun.com for Java
http://Java.sun.com/beans/spec.html for JavaBeans and/or in the corresponding printed documentation, e.g. "The Java Language Specification", J. GOSLING, Bill JOY, Guy STEELE, Addison Wesley, 1996, ISBN 0-201-63451-1.

In short, JavaBeans components (in short Beans) are re-usable software components which can be manipulated visually in a builder tool, e.g. an editor or graphical use interface builder. An example of a builder tool is the Java Workshop (JWS).

Further details about Beans may be found in the abundant literature, for example in a book entitled "Mastering Java-Beans" by Lawrence Vanhelsuwe, published by SYBEX (ISBN 0-7821-2097-0). Beans share certain common defining features, providing:

a set of properties (also termed variables);
a set of methods for performing actions; and
support for events and for introspection (also termed reflection), which enables access to the structure of java objects from outside. The Java Development Kit includes a corresponding reflection API.

A JavaBean supports the so-called getter/setter pairs, defined in accordance with lexical design patterns. This is described in detail in the above cited JavaBean documentation, and will now be summarized.

One considers, for a given Bean, all the public methods, the name of which begins with one of the following prefixes:

19. "set", e.g. setcurrency( ) or setActive( );

20. "get", e.g. getcurrency( );

21. Optionally, "is", e.g. is Active( ).

The methods verifying a. are termed setter or mutator methods. The methods verifying b. or c. are termed getter or accessor methods. In fact, the prefix "get" is sufficient to define getter methods; the prefix "is" is optional, and may be used e.g. for booleans where it is more suggestive in English language.

In each case, the method name is "reduced" by removing its prefix "set", "get" or "is". In the above examples, the reduced method names would be currency or active. Generically, the reduced method name is noted <Myname>. Also, <type> denotes the type of an entity, e.g. int[eger], string, bool[ean], etc. . . . , and <Myvalue> designates a value of the entity having the <type>. Formally, the above methods may now be generically represented as follows, in the example of Java code:

void set<Myname>(<Type> <Myvalue>)
<Type> get<Myname>( )
Boolean is <Myname>( ).

Where at least one of the above public methods exists for a given Java object, <Myname> is termed an attribute of that object, with the following possibilities:

if there are both a setter method set<Myname>( ) and at least one of the two getter methods get<Myname>( ) or is <Myname>( ), all accepting the same type of parameter value, the attribute <Myname> is read-write;

if there is only one of the two getter methods get<Myname>( ) or is <Myname>( ), the attribute <Myname> is read-only, and has the type of that method;

if there are only the two getter methods get<Myname>( ) and is <Myname>( ), all accepting a common type of parameter value, the attribute <Myname> is also read-only, and has the common type;

if there is only a "setter" method set<Myname>( ), the attribute <Myname> is write-only, and has the type of that method.

In fact, the attribute may be a property of the Bean, or not. In Java (although exceptions may exist), a property <myname> may conveniently begin with a lower case letter, while a corresponding attribute (<Myname>) begins with an upper case letter.

In other words, whenever a Bean offers a pair of getter and setter methods having the same <Myname>, then they form a getter/setter pair, defining a <Myname> read-write attribute of the JavaBean. In practice, since read-only or write-only attributes are less common, the expression "getter/setter pair" is usually broadened to mean "getter and/or setter", i.e. to cover also the cases where only a getter or accessor method or only a setter or mutator method is present. A getter and/or setter pair constitute accessor/mutator method(s). In the following, the expression "accessor methods" will be used to encompass both accessors and/or mutators.

Thus, those of the public methods which correspond to a getter and/or a setter method are correctly represented by the corresponding attribute. The read and/or write status of the attribute depends upon whether it corresponds to a getter method, a setter method, or both.

All the other public methods of a Bean which do not belong to a getter and/or setter pair are termed "operations".

It must be understood that the word "attribute" (of an object), as above defined, is based on accessor methods, e.g. the getter/setter pair, and also constitutes a representation of the accessor methods. This is not the same as the common meaning of the word attribute in the computer art, as used for example in an expression like "color attribute", where "attribute" refers to a property of an object, rather than to the object itself.

A4—Java MBeans

In EP-A-909057, it has been proposed to use Beans for managing resources in a computer system, especially a computer network. Beans used for this purpose are termed Managed Beans or MBeans (more generally, "managed object"). In EP-A-909057, it has been generally proposed to provide each MBean with public methods enabling the management of the resource represented by that MBean.

In order to avoid unduly lengthening this specification, the descriptive contents of EP-A-909057 (USSN 944,174, filed Oct. 6, 1997), EP-A-915419 (USSN 944,396, filed Oct. 6, 1997), EP-A-908816 (USSN 944,383, filed Oct. 6, 1997) and EP-A-909058 (USSN 946,140, filed Oct. 6, 1997), and WO 00/77631 are incorporated herein by reference.

Generally, the above cited prior patent applications define: managed objects or MBeans, a framework for registering MBeans, an MBean repository service for storing pointers to registered MBeans, a filtering service enabling selection of MBeans, a metadata service, an access control service, an event service, a relationship service, a dynamic native library loading service, a managed object adaptor server.

Now, managing a resource necessitates that the resource is "instrumented", i.e. that access is enabled to corresponding information on that resource. The instrumentation should obey preselected general rules (e.g. the JMX rules). Thus, in accordance with another definition, MBeans are software objects which implement not only resources, but also the instrumentation of such resources, in accordance with predefined rules. Conversely, the instrumentation of a given resource may be provided by one or more MBeans.

In accordance with JMX, there is defined for each MBean a management interface, comprising:
- attributes, each corresponding to a getter/setter pair of public methods, and
- operations, comprising those of the public methods which do not belong to getter/setter pairs.

Thus, an MBean may be viewed as a Java object that implements specified interfaces in accordance with specified rules, e.g. specified lexical design patterns. The exposed interface may be controlled: for example, an MBean attribute can allow read-only or read-write access.

| E.B1 servlet filter (implements javax.servlet.Filter class) ||
|---|---|
| void init( ) | Called before the filter goes into service, and sets the filter's configuration object |
| void destroy( ) | Called after the filter has been taken out of service |
| void doFilter( ) | Performs the actual filtering work. In the doFilter( ) method, a filter checks the status of the Overload Management System. If the system is overloaded, the filter sends an HTTP error 503 (server busy) to the client and/or log a message to report the condition. Otherwise, the filter invokes chain.doFilter( ) method to transfer control to the next filter or servlet. |

| E.B2 OverloadFilterMBean interface ||
|---|---|
| long getNbHits( ) | returns the number of hits registered in the filter |
| long getNbConditions( ) | returns the number of overload conditions registered in the filter. |
| String getErrorString( ) | return the HTML error string that is sent to clients when an overload condition occurs if the sendError property (see filter properties) is enabled. Otherwise an overload condition is logged in the web container's errors file. |
| void setErrorString (String error) | allows to change the HTML error string returned to the client |

| E.B3 OverloadCollectorMBean interface ||
|---|---|
| void start( ) | Starts the filter. When the doFilter( ) method is invoked, the filter collects various load metrics that are used by the overload assessment logic. |
| void stop( ) | Stops the overload filter. In that state the filter becomes a simple passthrough to the next filter or servlet. Data gathering is disabled. |
| boolean IsActive( ) | returns true if the filter is active, false otherwise. |
| Boolean isOverloaded | returns true if the filter has been notified of an overload condition. The boolean remains true until the filter is notified that the overload condition is no longer true. |

| E.B4-1 OverloadManager.CpuOverloadFilter (JMX domain) ||
|---|---|
| .type=filter, name=overloadmngr.OverloadFilter | the generic overload filter MBean for CPU activity providing access to sub-items: |
| ..Active | the status of the filter (true/false) |
| ..ErrorString | the error string returned to clients |
| ..NbConditions | the number of overload conditions encountered since start |
| ..NbHits | the number of hits registered in the filter |
| ..Overloaded | the overloaded state (true/false). This attributes mirrors the overloaded state attribute of the collector |
| ..start/stop | operations to change the active status of the overload filter |

| E.B4-2 OverloadManager.CpuOverloadFilter (JMX domain) [ctd] ||
|---|---|
| .type=monitor, name=overloadmngr.GaugeMonitor | the overload filter gauge monitor. |
| ..Active | the status of the gauge monitor (true/false) |
| ..DerivedGauge | the value of the collector's attribute being monitored |
| ..GranularityPeriod | the monitoring interval |
| ..HighThreshold | the high threshold as defined in properties by default |
| ..LowThreshold | the hard coded low threshold which triggers a low threshold notification. |
| ..NotifyHigh/Notify Low | specifies whether the gauge monitor should send notifications or not |
| ..ObservedAttribute | the attribute's name being monitored |
| ..ObservedObjectName | the object name of the Java object being monitored |
| ..setThreshold | operation to change high and low thresholds |
| ..start/stop | operations to change the active status of the gauge monitor. Stopping the gauge monitor deactivates the sending of threshold notifications |

| E.B4-3 OverloadManager.CpuOverloadFilter (JMX domain) [ctd] ||
|---|---|
| type=collector, name=overloadmngr. MetricsCollector | the overload filter collector in charge of acquiring the sweet-spot and run queue length data. It is also responsible for maintaining the accelerated monitoring interval under overload condition and providing access to performance metrics. |
| ..Active | the status of the collector (true/false) |
| ..Latency | the average latency since rollover interval start expressed in millisecond. |
| ..CurrentLoad | the current load rate of the server. That's the attribute being watched by the gauge monitor. A rate comprised between 0 and 1 means that the server is not overloaded |
| ..OptLatency | the optimum latency for the performance sweet-spot expressed in millisecond |
| ..OptThroughput | the optimum throughput for the performance sweet-spot expressed in number of hits/second |

-continued

E.B4-3
OverloadManager.CpuOverloadFilter (JMX domain) [ctd]

| | |
|---|---|
| ..Overloaded: | the actual overloaded state of the overload filter (true/false) |
| ..RolloverInterval | the performance sampling period |
| ..RunQueue | the run queue length is the other attribute that can be observed by the gauge monitoring |
| ..Throughput | the average throughput since rollover interval start expressed in number of hits/second |
| ..start/stop | operations to change the active status of the collector. If the collector is stopped, it becomes a simple passthrough. |

Exhibit C—Code

Where a left column has identifiers, these identifiers are not part of the code.

Code E.C1: Memory Overload Management

* Code EC10

```
A    public long getUsedMemory( ) {
B         long usedMemory;
              usedMemory = rt.totalMemory( ) – rt.freeMemory( );
C         if (usedMemory >= (maxMemory * threshold)) {
                   long isFree = rt.freeMemory( );
                   long wasFree;
                   do {
                        wasFree = isFree;
                        rt.gc( );
                        isFree = rt.freeMemory( );
                   } while (isFree > wasFree);
                   rt.runFinalization( );
                   usedMemory = rt.totalMemory( ) – rt.freeMemory( );
              }
D         return usedMemory;
     }
```

* CodeE.C11

```
<web-app uri="/amserver" dir="/<install-dir>/SUNWam/web-apps/services" enable="true">
<filter>
 <filter-name>MemoryOverloadFilter</filter-name>
 <filter-class>overloadmngr.OverloadFilter</filter-class>
   <init-param>
        <param-name>overloadmngr.propertiesFile</param-name>
        <param-value>
 /<install-dir>/SUNWam/OverloadManager/MemoryOverloadFilter.properties
        </param-value>
   </init-param>
</filter>
```

* Code E.C12

```
<filter-mapping>
     <filter-name>MemoryOverloadFilter</filter-name>
     <url-pattern>/login</url-pattern>
</filter-mapping>
</web-app>
```

*Code E.C13

```
##################################################
# Memory Overload Filter Parameters
##################################################
# Overload Filter started automatically (yes/no)
overloadmngr.autoStart=yes
# Overload Manager debug infos (yes/no). Prints debug info on the standard output.
overloadmngr.debug=no
# Overload Manager send HTTP error code 503 to clients when overload condition is
# encountered. Otherwise the condition is logged only in web server errors file (yes/no)
overloadmngr.httpError=yes
# Gauge Monitor monitoring interval in seconds
overloadmngr.monitorInterval=300
# Max memory allocated to the JVM heap
# Copy the jvm.maxHeapSize value in this field (default 1 GB)
overloadmngr.maxMemory=1073741824
# High threshold value (i.e. 80% of maxMemory).
# Low threshold is hard coded in the filter
overloadmngr.threshold=0.8
# Gauge Monitor observed attribute.
# Legal values include "CurrentLoad" and "RunQueue"
overloadmngr.observedAttr=CurrentLoad
# Error string to be send to clients along with HTTP error code 503
overloadmngr.errorString="<H1>Sun ONE Portal Server is Out of Memory</H>"
# Collector class name
overloadmngr.collectorClassName=overloadmngr.MemoryOverloadCollector
```

Code E.C2: CPU Overload Management

* Code E.C20

```
A    public void reset( ) {
B         optimumLatency = 0;
          optimumThroughput = 0;
          perfSweetSpot = 0;
     }
```

* Code E.C21

| | |
|---|---|
| A | public synchronized int getLatency( ) { |
| B | return ((hitsCounter != 0)?accumLatency/hitsCounter:0); |
| | } |

* Code E.C22

| | |
|---|---|
| A | public int getOptLatency( ) { |
| B | return optimumLatency; |
| | } |

* Code E.C23

| | |
|---|---|
| A | public synchronized float getThroughput( ) { |
| B | float elapsed; |
| C | while((elapsed = System.currentTimeMillis( )– begin)<=1000) { |
| | try { |
| | Thread.sleep(200); |
| | } catch (InterruptedException ie) { |

-continued

* Code E.C23

| | |
|---|---|
| | break; |
| | } |
| | } |
| D | return ((float)hitsCounter/(elapsed/1000)); |
| | } |

* Code E.C24

| | |
|---|---|
| A | public float getOptThroughput( ) { |
| B | return optimumThroughput; |
| | } |

* Code E.C25

| | |
|---|---|
| A | public synchronized int getRunQueue( ) { |
| B | return((hitsCounter!= 0) ? accumRunQueue/hitsCounter:0); |
| | } |

* Code E.C26

| | |
|---|---|
| A | public synchronized float getCurrentLoad( ) { |
| | float currentLoad = 0; |
| B | float perfCurrent = 0; |
| | long currentLatency = 0; |
| | float currentThroughput = getThroughput( ); |
| C | if (currentThroughput > 0) { |
| | currentLatency = getLatency( ); |
| | perfCurrent = currentThroughput/currentLatency; |
| | } |
| D | currentLoad = (perfCurrent != 0) ? perfSweetSpot / perfCurrent : 0; |
| | return currentLoad;; |
| | } |

* Code E.C27

```
<web-app uri="/portal" dir="/<install-dir>/SUNWps/web-apps/<instance>/portal" enable="true">
    <filter>
        <filter-name>CpuOverloadFilter</filter-name>
        <filter-class>overloadmngr.OverloadFilter</filter-class>
        <init-param>
            <param-name>overloadmngr.propertiesFile</param-name>
            <param-value>
            /<install-dir>/SUNWam/OverloadManager/CpuOverloadFilter.properties
            </param-value>
        </init-param>
    </filter>
<filter-mapping>
    <filter-name>CpuOverloadFilter</filter-name>
    <url-pattern>/dt</url-pattern>
</filter-mapping>
</web-app>
```

*Code E.C28:

```
#################################################
# CPU Overload Filter Parameters
#################################################
# Overload Filter started automatically (yes/no)
overloadmngr.autoStart=yes
# Overload Manager debug infos (yes/no). Prints debug info
   on the standard output.
overloadmmgr.debug=no
# Overload Manager send HTTP error code 503 to clients
   when overload condition is
# encountered. Otherwise the condition is logged only in web
   server errors file (yes/no)
overloadmngr.httpError=yes
# Gauge Monitor monitoring interval in seconds
overloadmngr.monitorInterval=30
# Performance metrics rollover interval in seconds
overloadmngr.rolloverInterval=10
```

```
# High threshold value (i.e. 50% beyond Sweet-spot).
# Low threshold is hard coded to 1 which corresponds to the
    sweet-spot
overloadmngr.threshold=1.5
# Gauge Monitor observed attribute.
# Legal values include "CurrentLoad" and "RunQueue"
overloadmngr.observedAttr=CurrentLoad
# Error string to be send to clients along with HTTP error code
    503
overloadmngr.errorString="<H1>Sun ONE Portal Server
    Busy</H>"
# Collector class name
overloadmngr.collectorClassName=overloadmngr.Cpu
    OverloadCollector
```

The invention claimed is:

1. A method of managing overload in a server system, having a service operating in response to input requests, and a server operation parameter related to the operation of said service, the method comprising the steps of:
 a. monitoring successive values of the server operation parameter as a function of time,
 b. from such values,
  b1. evaluating a first condition, which involves whether the server operation parameter passes a first threshold value in a first direction, and
  b2. evaluating a second condition, which involves whether the server operation parameter passes a second threshold value in a second direction, wherein the second condition includes determining that the second direction is opposite to the first direction, and extends from the first threshold value to the second threshold value,
 c. starting rejection of input requests, upon verification of a third condition, wherein the third condition comprises (i) determining a predetermined grace period subsequent to verification of the first condition has elapsed, and (ii) determining the second condition has not been verified during said grace period; and
 d. terminating rejection of input requests upon verification of a fourth condition, related to the verification of said second condition.

2. The method of claim 1, wherein the fourth condition of step d. comprises determining the second condition has been verified.

3. The method of claim 1, wherein the fourth condition of step d. comprises determining the second condition has been verified after the third condition has been verified.

4. The method of claim 1, wherein step b1. is performed at a first rate, and step b2. is performed at a second rate, not lower than the first rate.

5. The method of claim 4, wherein step b2. is performed within a time period staffing upon verifying the first condition at step b1., and terminating upon verifying the fourth condition at step d.

6. The method of claim 1, wherein said server operation parameter represents a quantity related to a memory usage in the server.

7. The method of claim 1, wherein said server operation parameter represents a quantity related to the sewer throughput and to the sewer latency.

8. The method of claim 7, wherein step a. comprises deriving the server operation parameter from a given combination of the server throughput with the server latency.

9. The method of claim 8, wherein step a. further comprises:
 a1. maintaining a reference value of the server throughput and a reference value of the server latency, said reference values being updated upon verification of a fifth condition, comprising the fact that the current value of the server throughput does overlie its reference value, and
 a2. deriving a reference value of said server operation parameter from a combination of the reference value of the server throughput with the reference value of the server latency, said combination being of the same nature as said given combination.

10. The method as claimed in claim 8, wherein said server operation parameter is derived from the ratio of the server throughput to the reference value of the server latency and said reference value of the server operation parameter is derived from the ratio of the reference value of the server throughput to the reference value of the server latency.

11. The method of claim 9, wherein the fifth condition further comprises the fact that the current value of the server latency does not overlie its reference value.

12. The method of claim 11, wherein the fifth condition further comprises the fact that the server requests queue length remains substantially constant.

13. The method of claim 9, wherein said first and second threshold values are derived from said reference value of the server operation parameter.

14. The method of claim 9, wherein steps a1. and a2. are performed at a third rate, wherein the third rate is not lower than the first rate.

15. An overload manager device for use in a server system, having a service operating in response to input requests, and a server operation parameter related to the operation of said service, said device comprising:
 a monitoring function for evaluating successive values of the server operation parameter as a function of time;
 a first logic function capable of evaluating a first condition, which involves whether the sewer operation parameter passes a first threshold value in a first direction;
 a second logic function capable of evaluating a second condition, which involves whether the sewer operation parameter passes a second threshold value in a second direction, wherein the second condition includes determining that the second direction is opposite to the first direction, and extending from the first threshold value to the second threshold value; and
 a request supervisor operable for:
  staffing rejection of the input requests, upon verification of a third condition, wherein the third condition comprises (i) determining a predetermined grace period subsequent to verification of the first condition has elapsed, and (ii) determining the second condition has not been verified during said grace period; and
  terminating rejection of the input requests upon verification of a fourth condition related to the verification of said second condition.

16. The device of claim 15, wherein the fourth condition comprises determining the second condition has been verified.

17. The device of claim 15, wherein the fourth condition comprises determining the second condition has been verified after the third condition has been verified.

18. The device of claim 15, wherein the first logic function is operable at a first rate, and the second logic function is operable at a second rate not lower than the first rate.

19. The device of claim 18, wherein the second logic function is operable within a time interval starting upon verifying the first condition, and terminating upon verifying the fourth condition.

20. The device of claim 15, wherein said server operation parameter represents a quantity related to a memory usage in the server.

21. The device of claim 15, wherein said server operation parameter represents a quantity related to the server throughput and to the server latency and wherein the monitoring function is operable for deriving the server operation parameter from a given combination of the server throughput with the server latency.

22. The device of claim 21, further comprising a tracking function, said tracking function maintaining a reference value of the server throughput and a reference value of the server latency and being operable:
for updating the reference values upon verification of a fifth condition, comprising the fact that the current value of the server throughput does overlie its reference value; and
for deriving the first and second threshold values from a combination of the reference value of the server throughput with the reference value of the server latency, said combination being of the same type as said given combination.

23. The device as claimed in claim 21, wherein the server operation parameter is derived from the ratio of the server throughput to the reference value of the server latency and the first and second threshold values are derived from the ratio of the reference value of the server throughput to the reference value of the server latency.

24. The device of claim 22, wherein the fifth condition further comprises the fact that the current value of the server latency does not overlie its reference value.

25. The device of claim 24, wherein the fifth condition further comprises the fact that the server requests queue length remains substantially constant.

26. The device as claimed in any of claim 22, wherein the tracking function is operable at a third rate, wherein the third rate is not lower than the first rate.

27. The device of claim 15, comprising an overload manager object, having filter methods capable of implementing said request supervisor, a gauge monitor and further methods capable of implementing the monitoring function, the first logic function and the second logic function in cooperation with said gauge monitor.

28. The device of claim 27, wherein the overload manager object, the gauge monitor and the further methods are instantiated from at least one generic class.

29. The device of claim 28, wherein the overload manager object comprises at least one MBean.

30. The device of claim 20, comprising an overload manager object related to a memory usage in the server.

31. The device of claim 21, comprising an overload manager object related to the server throughput and to the server latency.

32. A portal server having:
an overload manager device;
a service operating in response to input requests; and
a server operation parameter related to the operation of said service;
wherein said device comprises:
a monitoring function for evaluating successive values of the server operation parameter as a function of time;
a first logic function capable of evaluating a first condition, which involves whether the server operation parameter passes a first threshold value in a first direction;
a second logic function capable of evaluating a second condition, which involves whether the server operation parameter passes a second threshold value in a second direction, wherein the second condition includes determining that the second direction is opposite to the first direction, and extending from the first threshold value to the second threshold value; and
a request supervisor operable for:
starting rejection of input requests, upon verification of a third condition, wherein the third condition comprises (i) determining a predetermined grace period subsequent to verification of the first condition has elapsed, and (ii) determining the second condition has not been verified during said grace period; and
terminating rejection of the input requests upon verification of a fourth condition related to the verification of said second condition; and
wherein said server operation parameter represents a quantity related to a memory usage in the server.

33. A computer readable storage medium including program instructions executable to implement a method of managing overload in a server system, having a service operating in response to input requests, and a server operation parameter related to the operation of said service, the method comprising the steps of:
a. monitoring successive values of the server operation parameter as a function of time,
b. from such values,
b1. evaluating a first condition, which involves whether the server operation parameter passes a first threshold value in a first direction, and
b2. evaluating a second condition, which involves whether the server operation parameter passes a second threshold value in a second direction, wherein the second condition includes determining that the second direction is opposite to the first direction, and extending from the first threshold value to the second threshold value,
c. starting rejection of input requests, upon verification of a third condition, wherein the third condition comprises (i) determining a predetermined grace period subsequent to verification of the first condition has elapsed, and (ii) determining the second condition has not been verified during said grace period, and
d. terminating rejection of input requests upon verification of a fourth condition, related to the verification of said second condition.

34. An overload manager device for use in a server system, having a service operating in response to input requests, and a server operation parameter related to the operation of said service, wherein said device is configured to:
compare values of the server operation parameter to a first threshold value;
in response to detecting that the server operation parameter has passed the first threshold value in a first direction:
compare values of the server operation parameter to a second threshold value, wherein the second threshold value is different from the first threshold value;
start rejection of input requests, upon determining:
a predetermined grace period subsequent to detecting the server operation parameter has passed the first threshold value in a first direction has elapsed; and
determining a second condition has not been verified during said grace period, the second condition involving determining whether the sewer operation parameter passes a second threshold value in a second direction, wherein the second condition includes determining that the second direction is opposite to the first direction; and terminate rejection of input requests in response to detecting the sewer operation parameter has passed the second threshold value in a direction opposite the first direction during the grace period.

35. The device of claim 34, wherein said server operation parameter represents a quantity related to a memory usage in the server.

36. The method of claim 34, further comprising deriving the sewer operation parameter from a given combination of a server throughput with a server latency.

* * * * *

UNITED STATES PATENT AND TRADEMARK OFFICE
CERTIFICATE OF CORRECTION

PATENT NO. : 7,610,377 B2  Page 1 of 1
APPLICATION NO. : 10/765828
DATED : October 27, 2009
INVENTOR(S) : Patrick Petit It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1093 days.

Signed and Sealed this

Twelfth Day of October, 2010

David J. Kappos
*Director of the United States Patent and Trademark Office*